US012809722B2

(12) United States Patent
Choi et al.

(10) Patent No.: US 12,809,722 B2
(45) Date of Patent: *Nov. 24, 2026

(54) ELECTRONIC DEVICE HAVING A PLURALITY OF CHIPLETS AND METHOD FOR BOOTING THEREOF

(71) Applicant: REBELLIONS INC., Seongnam-si (KR)

(72) Inventors: Myunghoon Choi, Seongnam-si (KR); Chang-Hyo Yu, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,198

(22) Filed: Feb. 12, 2025

(65) Prior Publication Data

US 2025/0181453 A1 Jun. 5, 2025

Related U.S. Application Data

(63) Continuation of application No. 18/809,049, filed on Aug. 19, 2024, now Pat. No. 12,248,371.

(30) Foreign Application Priority Data

Aug. 25, 2023 (KR) ........................ 10-2023-0112348
Nov. 24, 2023 (KR) ........................ 10-2023-0166027

(51) Int. Cl.
*G06F 11/00* (2006.01)
*G06F 11/14* (2006.01)
(Continued)

(52) U.S. Cl.
CPC ........ *G06F 11/1417* (2013.01); *G06F 21/575* (2013.01); *G06F 13/4221* (2013.01); *G06F 2213/0026* (2013.01)

(58) Field of Classification Search
CPC ........................... G06F 11/1417; G06F 21/575
See application file for complete search history.

(56) References Cited

U.S. PATENT DOCUMENTS 12,081,216 B1 * 9/2024 Kandele ........... H03K 19/17768
2021/0097184 A1 4/2021 Rao et al.
(Continued)

FOREIGN PATENT DOCUMENTS

KR 10-2022-0050290 A 4/2022
KR 10-2022-0070462 A 5/2022
(Continued)

*Primary Examiner* — Joshua P Lottich
(74) *Attorney, Agent, or Firm* — BROADVIEW IP LAW, PC

(57) ABSTRACT

An electronic device comprises a main chiplet including a first memory and at least one sub-chiplet including a second memory, wherein the main chiplet is configured to initialize a first interface for inter-chiplet connection based on first boot firmware stored in the first memory in response to receiving booting signal, acquire third boot firmware stored in an external memory, initialize a second interface for communication between an external device and the main chiplet based on the third boot firmware, set a configuration for interconnection between the main chiplet and the at least one sub-chiplet, initialize a third memory included in the main chiplet, and load at least one of an application firmware or an operating system to the third memory, and the at least one sub-chiplet is configured to initialize the first interface based on second boot firmware stored in the second memory in response to receiving the booting signal.

20 Claims, 13 Drawing Sheets

(51) Int. Cl.
*G06F 21/57* (2013.01)
*G06F 13/42* (2006.01)

(56) References Cited

U.S. PATENT DOCUMENTS

| | | | | |
|---|---|---|---|---|
| 2022/0121750 | A1 | 4/2022 | Lee et al. | |
| 2023/0046542 | A1* | 2/2023 | Narala | G06F 1/324 |
| 2023/0080284 | A1 | 3/2023 | Lee | |
| 2023/0143189 | A1 | 5/2023 | Hong et al. | |
| 2023/0258716 | A1 | 8/2023 | Corp | |
| 2024/0003972 | A1* | 1/2024 | Nguyen | G01R 31/31908 |
| 2024/0296102 | A1* | 9/2024 | Isachar | G06F 11/2242 |
| 2024/0330183 | A1* | 10/2024 | Kovac | G06F 12/0873 |
| 2024/0385643 | A1* | 11/2024 | Gupta | G06F 1/10 |
| 2025/0045057 | A1* | 2/2025 | Raghuraman | G06F 9/4401 |

FOREIGN PATENT DOCUMENTS

| | | | |
|---|---|---|---|
| KR | 10-2023-0038082 | A | 3/2023 |
| KR | 10-2023-0067430 | A | 5/2023 |

* cited by examiner

ELECTRONIC DEVICE HAVING A PLURALITY OF CHIPLETS AND METHOD FOR BOOTING THEREOF

CROSS-REFERENCE TO RELATED APPLICATION

This application is a continuation application of U.S. patent application Ser. No. 18/809,049, filed on Aug. 19, 2024, which claims priority under 35 U.S.C. § 119 to Korean Patent Application No. 10-2023-0112348, filed in the Korean Intellectual Property Office on Aug. 25, 2023, and Korean Patent Application No. 10-2023-0166027, filed in the Korean Intellectual Property Office on Nov. 24, 2023, the entire contents of which are hereby incorporated by reference.

BACKGROUND

Field

The present disclosure relates to an electronic device including a plurality of chiplets and a method for booting thereof.

Description of Related Art

As the demand for high performance and miniaturization of semiconductor devices and electronic products using the semiconductor devices increases, various package technologies related to semiconductor devices are being developed. In recent years, along with the development of these technologies, packaging technologies using chiplets have emerged.

A chiplet system may refer to a system that is provided by, rather than configuring chips performing various functions on one die (or substrate), dividing the chips in units of functionalities, configuring the divided chips on each of a plurality of dies (chiplet), and packaging them into one system. In other words, the chiplet system was developed to overcome the limitations of existing monolithic chips, and the dies in the package may be connected to each other through a silicon interposer and communicate with each other according to a die-to-die communication standard such as universal chiplet interconnect express (UCIe).

Since the chiplets can be miniaturized in units of functionalities, it is possible to overcome the size limitation of reticles, that is, the templates that print circuits on wafer surfaces using light in the photo process of semiconductors. In addition, since the yield of semiconductor manufacturing tends to be inversely proportional to the area, using the chiplets can increase the yield of semiconductor manufacturing and also reduce manufacturing costs. Accordingly, in recent years, there is an increasing demand to use the chiplets when manufacturing electronic products, and it is also required to develop technologies for methods for booting the electronic devices including a plurality of chiplets.

SUMMARY

In order to solve one or more problems (e.g., the problems described above and/or other problems not explicitly described herein), the present disclosure provides an electronic device including a plurality of chiplets and a method for booting thereof.

The present disclosure may be implemented in a variety of ways, including a method, an apparatus (system), or a non-transitory computer-readable recording medium storing instructions.

According to an aspect of the present disclosure, an electronic device comprising a plurality of chiplets may comprise a main chiplet including a first memory in which first boot firmware is stored, and at least one sub-chiplet including a second memory in which second boot firmware is stored, wherein the main chiplet may be configured to initialize a first interface for inter-chiplet connection based on the first boot firmware in response to receiving signal related to booting, acquire third boot firmware stored in an external memory, initialize a second interface for communication between an external device and the main chiplet based on the third boot firmware, set a configuration for interconnection between the main chiplet and the at least one sub-chiplet, initialize a third memory included in the main chiplet, and load at least one of an application firmware or an operating system to the third memory, and the at least one sub-chiplet may be configured to initialize the first interface based on the second boot firmware in response to receiving the signal related to booting.

According to an aspect of the present disclosure, at least one of the main chiplet or the at least one sub-chiplet may be configured to perform a phase-locked loop (PLL) control operation to adjust a clock frequency.

According to an aspect of the present disclosure, the main chiplet may be configured to check a state of at least one of the main chiplet or the at least one sub-chiplet, and perform a recovery process, if abnormal state of the at least one of the main chiplet or the at least one sub-chiplet is identified based on the result of the check.

According to an aspect of the present disclosure, the main chiplet may be configured to be connected to an external device for debugging, and check a state of at least one of the main chiplet or the at least one sub-chiplet using the external device.

According to an aspect of the present disclosure, the main chiplet may be configured to perform the recovery process through a third interface for connecting the main chiplet and the at least one sub-chiplet if the abnormal state is identified as being due to the first interface, wherein a speed of data transmission and reception provided by the third interface may be set to be slower than a speed of data transmission and reception provided by the first interface.

According to an aspect of the present disclosure, the second interface may include a peripheral component interconnect express (PCIe) interface, and the main chiplet may be configured to switch a link training and status state machine (LTSSM) to a detection state to detect a link related to a connection of a device through the PCIe interface after initializing the PCIe interface.

According to an aspect of the present disclosure, the configuration may include address information for data transmission and reception between the main chiplet and the at least one sub-chiplet.

According to an aspect of the present disclosure, the main chiplet may be configured to initialize the first interface for connection with at least one first sub-chiplet, of the at least one sub-chiplet, adjacent to the main chiplet after acquiring the third boot firmware if the at least one sub-chiplet fail to initialize the first interface based on the second boot firmware, set the configuration for interconnection between the main chiplet and the at least one first sub-chiplet, and initialize the first interface for connection with at least one second sub-chiplet, of the at least one sub-chiplet, adjacent to the at least one first sub-chiplet.

According to an aspect of the present disclosure, the main chiplet may further comprise a first security module in which an immutable first source is stored, and may be configured to check an integrity of the first boot firmware using the first source before initializing the first interface, and load the first boot firmware if the first boot firmware passes the integrity check.

According to an aspect of the present disclosure, the main chiplet may be configured to check an integrity of the third boot firmware using the first source before initializing the second interface, and load the third boot firmware if the third boot firmware passes the integrity check.

According to an aspect of the present disclosure, the at least one sub-chiplet may further comprise a second security module in which an immutable second source is stored, and may be configured to check an integrity of the second boot firmware using the second source before initializing the first interface, and load the second boot firmware if the second boot firmware passes the integrity check.

According to an aspect of the present disclosure, the main chiplet may be configured to load at least a part of the third boot firmware to the at least one sub-chiplet if the third boot firmware passes the integrity check, and the at least one sub-chiplet may be configured to check an integrity of the at least part of the third boot firmware using the second source, and perform at least a part a booting process based on the at least part of the third boot firmware, if the at least part of the third boot firmware passes the integrity check.

According to an aspect of the present disclosure, the main chiplet may be configured to proceed with a recovery process, if at least one of the first boot firmware, the second boot firmware, or the third boot firmware fails the integrity check.

According to an aspect of the present disclosure, the main chiplet may be configured such that, if the main chiplet and the at least one sub-chiplet are heterogeneous chiplets, different security levels of a booting process are set for the main chiplet and the at least one sub-chiplet.

According to an aspect of the present disclosure, the main chiplet may be configured to perform a runtime integrity check on the main chiplet and the at least one sub-chiplet after loading at least one of the application firmware or the operating system.

According to an aspect of the present disclosure, a method for booting an electronic device including a plurality of chiplets may comprise initializing a first interface for inter-chiplet connection based on first boot firmware stored in a first memory of a main chiplet and second boot firmware stored in a second memory of at least one sub-chiplet in response to receiving a signal related to booting, acquiring third boot firmware stored in an external memory, initializing a second interface for communication between an external device and the main chiplet based on the third boot firmware, setting configuration for interconnection between the main chiplet and the at least one sub-chiplet, initializing a third memory included in the main chiplet, and loading at least one of an application firmware or an operating system to the third memory.

According to an aspect of the present disclosure, the method may further comprise checking an integrity of the first boot firmware using a first immutable source stored in a first security module of the main chiplet before initializing the first interface, and loading the first boot firmware if the first boot firmware passes the integrity check.

According to an aspect of the present disclosure, the method may further comprise checking an integrity of the third boot firmware using the first source before initializing the second interface, and loading the third boot firmware if the third boot firmware passes the integrity check.

According to an aspect of the present disclosure, the method may further comprise checking an integrity of the second boot firmware using an immutable second source stored in a second security module of the at least one sub-chiplet before initializing the first interface, and loading the second boot firmware if the second boot firmware passes the integrity check.

According to an aspect of the present disclosure, the method may further comprise loading at least a part of the third boot firmware to the at least one sub-chiplet if the third boot firmware passes the integrity check, and checking an integrity of the at least part of the third boot firmware using the second source, and performing at least a part a booting process based on the at least part of the third boot firmware if the at least part of the third boot firmware passes the integrity check.

According to some aspects of the present disclosure, a plurality of chiplets in the chiplet system are divided into a main chiplet that communicates with an external device, and the other chiplets, that is, the sub-chiplets, and by setting the booting process in each of the chiplets, it is possible to easily perform health check on each chiplet and apply alternative process if the result of the health check indicates an abnormal state.

In addition, according to some aspects of the present disclosure, by checking the integrity of the boot firmware through the security module that stores immutable source in each of the plurality of chiplets, stability and security for the system can be ensured.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which.

DETAILED DESCRIPTION

Figure 1:
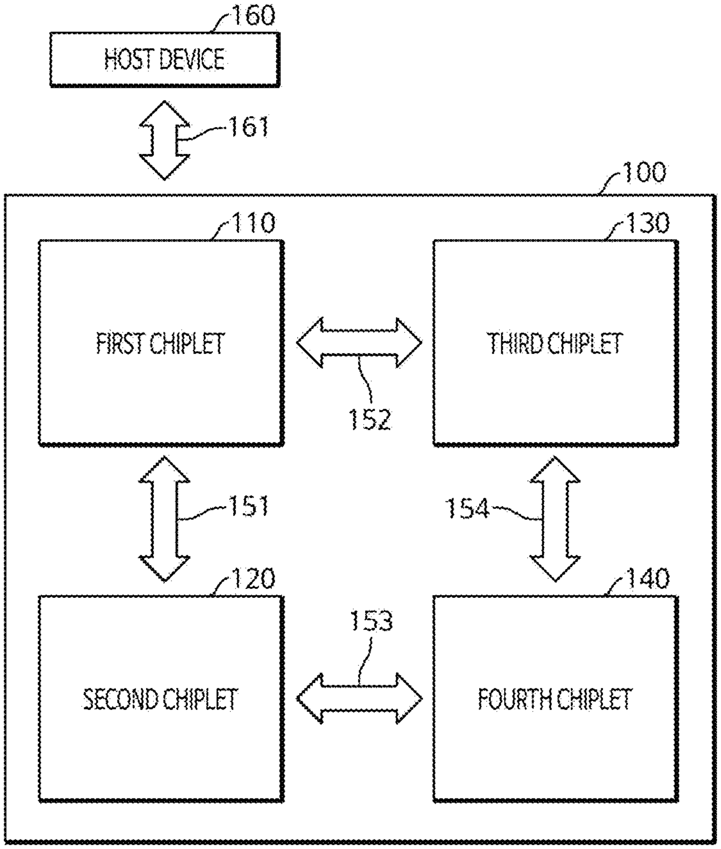
FIG. 1 is a diagram provided to explain a configuration of an electronic device including a plurality of chiplets.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Accordingly, the terms used in this disclosure should be defined based on the meaning of the term and the overall content of the present disclosure, rather than simply the name of the term.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

A "module" or "unit" may be implemented as a processor and a memory, or may be implemented as a circuit (circuitry). Terms such as circuit and circuitry may refer to circuits in hardware, but may also refer to circuits in software. The "processor" should be interpreted broadly to encompass a general-purpose processor, a central processing unit (CPU), a microprocessor, a digital signal processor (DSP), a neural processing unit (NPU), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in a plurality of A.

Hereinafter, various examples of the present disclosure will be described in detail with reference to the accompanying drawings.

FIG. 1 is a diagram provided to explain a configuration of an electronic device including a plurality of chiplets. Referring to FIG. 1, an electronic device 100 may include a plurality of chiplets. For example, the electronic device 100 may include a first chiplet 110, a second chiplet 120, a third chiplet 130, and a fourth chiplet 140. However, the number of chiplets included in the electronic device 100 is not limited to the above. According to various aspects, the electronic device 100 may omit at least one of the chiplets described above, and may further include at least one more additional chiplet. The electronic device 100 including a plurality of chiplets may be packaged, and thus may be referred to as a package device or a chiplet system.

The plurality of chiplets may be connected to each other through a first interface. For example, the first chiplet 110 and the second chiplet 120 may be connected through an interface (1-1) 151, the first chiplet 110 and the third chiplet 130 may be connected through an interface (1-2) 152, the second chiplet 120 and the fourth chiplet 140 may be connected through an interface (1-3) 153, and the third chiplet 130 and the fourth chiplet 140 may be connected through an interface (1-4) 154. The first interface may refer to a die-to-die interface, and may include UCIe etc., for example.

Any one (e.g., the first chiplet 110) of the plurality of chiplets may be connected to an external device (e.g., a host device 160) through a second interface 161. In this case, the other chiplets (e.g., the second chiplet 120, the third chiplet 130, and the fourth chiplet 140) may be restricted from communicating with the external device. A chiplet (e.g., the first chiplet 110) communicating with the external device may be referred to as a main chiplet, a primary die, a base chiplet, etc., and the other chiplets (e.g., the second chiplet 120, the third chiplet 130, the fourth chiplet 140) with limited communication with the external device may be referred to as a sub-chiplet, a secondary die, a partner chiplet, etc. For example, the second interface 161 may refer to a host interface, and may include a peripheral component interconnect express (PCIe), etc.

The electronic device 100 including a plurality of chiplets, that is, the chiplet system may extend the functions of the host device 160 (or the host system) and perform parallel processing on at least some functions. For example, the host device 160 may manage the chiplet system and distribute tasks related to at least some functions to the chiplet system, and the chiplet system may process the distributed tasks in parallel. This enables to not only optimize and enhance the performance of the entire system including the host device 160 and the chiplet system, but also provide a scalable computing environment. The chiplet system may perform functions of a multi-processor, a memory controller, a cache, a network interface, etc.

Figure 2:
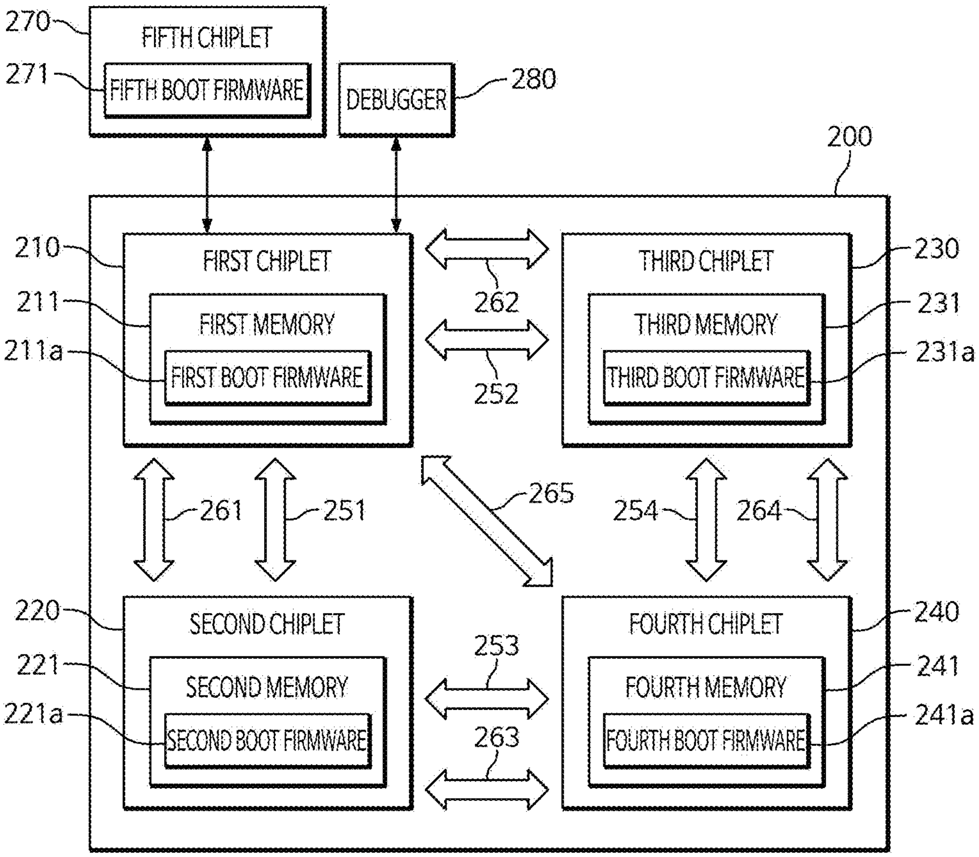
FIG. 2 is a diagram provided to explain a configuration related to booting an electronic device including a plurality of chiplets.

FIG. 2 is a diagram provided to explain a configuration related to booting an electronic device including a plurality of chiplets. Referring to FIG. 2, upon power on and in response to receiving a signal related to booting (e.g., a booting signal, a reset signal, etc.), an electronic device 200 (e.g., the electronic device 100 of FIG. 1) including a plurality of chiplets (e.g., a first chiplet 210, a second chiplet 220, a third chiplet 230, and/or a fourth chiplet 240), that is, the chiplet system may perform a booting process. The booting process may include an operation of initializing and setting a hardware configuration such that at least one of application firmware or operating system may be loaded and executed according to a function of the electronic device 200. This booting process may be performed by the execution of boot firmware (e.g., first boot firmware 211*a*, second boot firmware 221*a*, third boot firmware 231*a*, fourth boot firmware 241*a*, and/or fifth boot firmware 271). Hereinbelow, for convenience of explanation, it is described that the chiplet system includes four chiplets, for example, the first chiplet 210, the second chiplet 220, the third chiplet 230, and the fourth chiplet 240, but the number of chiplets is not limited thereto.

The booting process may include a first stage booting process and a second stage booting process. The first stage booting process may proceed upon power supply to the chiplet system and in response to receiving a signal related to booting. In the first stage booting process, initial setting required for driving a chiplet may be performed. For example, in the first stage booting process, the chiplet system may initialize first interfaces 251, 252, 253, and 254 (e.g., the first interfaces 151, 152, 153, and 154 of FIG. 1) for inter-chiplet connection. The first interfaces 251, 252, 253, and 254 may refer to die-to-die interfaces, and may include UCIe etc., for example.

The first stage booting process may be performed by the execution of the first stage boot firmware stored in a memory included in each of the plurality of chiplets. For example, the first chiplet 210 may include a first memory 211, and the first stage booting process for the first chiplet 210 may be performed by the execution of the first boot firmware 211*a* stored in the first memory 211. In addition, the second chiplet 220 may include a second memory 221, and the first stage booting process for the second chiplet 220 may be performed by the execution of the second boot firmware 221*a* stored in the second memory 221. In addition, the third chiplet 230 may include a third memory 231, and the first stage booting process for the third chiplet 230 may be performed by the execution of the third boot firmware 231*a* stored in the third memory 231. In addition, the fourth chiplet 240 may include a fourth memory 241, and the first stage booting process for the fourth chiplet 240 may be performed by the execution of the fourth boot firmware 241*a* stored in the fourth memory 241. The memories (e.g., the first memory 211, the second memory 221, the third memory 231, and the fourth memory 241) in a plurality of chiplets that store the first stage boot firmware (e.g., the first boot firmware 211*a*, the second boot firmware 221*a*, the third boot firmware 231*a*, and the fourth boot firmware 241*a*) may include a non-volatile memory. The first stage booting processes for the first chiplet 210, the second chiplet 220, the third chiplet 230, and the fourth chiplet 240 may be performed in parallel.

In the first stage booting process, the chiplet system may set a clock of at least one chiplet. For example, in the first stage booting process, at least one of the first chiplet 210, the second chiplet 220, the third chiplet 230, or the fourth chiplet 240 may perform a phase-locked loop (PLL) control operation for adjusting the clock frequency. The PLL may include a circuit for frequency adjustment, control and timing synchronization of a clock signal. For example, a PLL may include a circuit capable of synchronizing a frequency of an internal clock signal provided by the chiplet with an external timing signal. In the first stage booting process, at least one of the first chiplet 210, the second chiplet 220, the third chiplet 230, or the fourth chiplet 240 may perform a PLL control operation of increasing the clock frequency, thereby enabling a high-speed operation of the die.

In the first stage booting process, the chiplet system may perform a health check of at least one chiplet. The health check of the chiplet may involve monitoring the hardware components included in the chiplet to check the status such as power supply, temperature, voltage, current, memory, etc., and determining (or identifying) whether the result of the check indicates abnormal state (e.g., whether error or abnormality occurs). The health check may be performed for each chiplet. In addition, if the abnormal status of the chiplet is identified based on the result of the check, at least one of the first chiplet 210, the second chiplet 220, the third chiplet 230, or the fourth chiplet 240 may proceed with a recovery process. The recovery process will be described below in detail with reference to FIGS. 12 and 13.

The main chiplet (e.g., the first chiplet 210) that completed the first stage booting process may perform the second stage booting process. In addition, sub-chiplets (e.g., the second chiplet 220, the third chiplet 230, or the fourth chiplet 240) that completed the first stage booting process may be switched to a standby state to receive commands from the main chiplet.

The second stage booting process may perform settings for performing tasks and functions for connecting to an external device. For example, in the second stage booting process, the chiplet system may initialize a second interface (e.g., the second interface 161 in FIG. 1) for communication between an external device (e.g., the host device 160 in FIG. 1) and the main chiplet. The second interface may include PCIe, etc. as a host interface. To this end, the first chiplet 210 may include a separate MCU (not illustrated) for performing PCIe-related operation.

In addition, in the second stage booting process, the chiplet system may set configuration for inter-chiplet connection. For example, through the configuration for inter-chiplet connection, the chiplet system may set a connection method of the first interfaces 251, 252, 253, and 254 for inter-chiplet connection. The configuration for inter-chiplet connection may include address information (e.g., route table) for data transmission and reception between chiplets. In addition, in the second stage booting process, the chiplet system may initialize the memory to load at least one of the application firmware or the operating system. The memory initialized in the second stage booting process may include a volatile memory (e.g., dynamic random access memory (DRAM)).

The second stage booting process may be performed by the execution of the boot firmware for the second stage booting process stored in a memory outside the chiplet system. For example, the second stage booting process for the chiplet system may be performed by the execution of the fifth boot firmware 271 stored in a memory 270 outside the chiplet system. The memory (e.g., the fifth memory 270) outside the chiplet system storing the second stage boot firmware (e.g., the fifth boot firmware 271) may include a non-volatile memory. Access to the second stage boot firmware may be granted only to the main chiplet (e.g., the first chiplet 210). Accordingly, the main chiplet may load the second stage boot firmware from the external memory to the chiplet system and execute the same. The external memory may refer to any external memory accessible to the main chiplet. For example, the external memory may refer to any memory accessible to the external device (e.g., the host device 160 of FIG. 1). In this case, the sub-chiplets (e.g., the second chiplet 220, the third chiplet 230, and the fourth chiplet 240) may be restricted from accessing the second stage boot firmware.

In the second stage booting process, the main chiplet may initialize a second interface (e.g., the second interface 161 in FIG. 1) for communication between the external device (e.g., the host device 160 in FIG. 1) and the main chiplet. The second interface may include a PCIe interface. After initializing the PCIe interface, the main chiplet may switch a link training and status state machine (LTSSM) to a detection state to detect a link related to the connection of the device through the PCIe interface. LTSSM is a hardware-based process controlled by the physical layer in a PCIe environment, and may set and initialize the links and ports of the connected devices to enable packet transmission.

In the second stage booting process, the main chiplet may set configuration for inter-chiplet connection. For example, through the configuration for inter-chiplet connection, the main chiplet may set a connection method of the first interfaces 251, 252, 253, and 254 for inter-chiplet connection. The configuration for inter-chiplet connection may include address information for data transmission and reception between the chiplets. That is, in the second stage booting process, the main chiplet may set a route table including the address information for data transmission and reception between chiplets. In this regard, the first interfaces 251, 252, 253, and 254 for inter-chiplet connection may be initialized in the first stage booting process. Meanwhile, if initialization of the first interfaces 251, 252, 253, and 254 fails in the first stage booting process, the first interfaces 251, 252, 253, and 254 may be initialized by the main chiplet in the second stage booting process. If the sub-chiplet (e.g., the second chiplet 220, the third chiplet 230, or the fourth chiplet 240) fails to initialize the first interface 251, 252, 253, and 254 based on the boot firmware (e.g., the second boot firmware 221*a*, the third boot firmware 231*a*, or the fourth boot firmware 241*a*) for the first stage booting process, the main chiplet after acquiring the boot firmware (e.g., the fifth boot firmware 271) for the second stage booting process may initialize the first interfaces 251 and 252 for connection with the sub-chiplets (e.g., the second chiplet 220 and the third chiplet 230), of the sub-chiplets, that are adjacent to the main chiplet. In addition, the main chiplet may set the configuration for interconnection between the sub-chiplets adjacent to the main chiplet. For example, the main chiplet may set a route table including address information for data transmission and reception with the adjacent sub-chiplets. The main chiplet may initialize the first interfaces 253 and 254 for connection with other sub-chiplets (e.g., the fourth chiplet 240), of the sub-chiplets, that are adjacent to the previously set sub-chiplets (e.g., the second chiplet 220 and the third chiplet 230).

In the second stage booting process, the main chiplet may perform a health check on at least one chiplet. For example, in the second stage booting process, the main chiplet may check whether the connection path inside the chiplet system is normal. In addition, if the result of the check identifies that the state including the state of the connection path between the chiplets is abnormal, the main chiplet may proceed with a recovery process. The recovery process will be described below in detail with reference to FIGS. 12 and 13.

The main chiplet may be connected to an external device (e.g., a debugger 280) for debugging. In this case, the main chiplet may use the debugger 280 to perform a health check on at least one chiplet included in the chiplet system. For example, the main chiplet may perform analysis on an error or abnormality in the chiplet system through the debugger 280. As described above, connection with the external device such as the debugger 280 may be possible only through the main chiplet.

If the result of the check on the chiplet indicates abnormal state and the abnormal state is identified as being due to the first interfaces 251, 252, 253, and 254 for inter-chiplet connection, the main chiplet may perform analysis of the abnormal state through the third interfaces 261, 262, 263, 264, and 265 for inter-chiplet connection. In addition, the main chiplet may perform the recovery process through the third interfaces 261, 262, 263, 264, and 265. The third interfaces 261, 262, 263, 264, and 265 may be backup interfaces, and may be set with a slower data transmission and reception speed than the first interfaces 251, 252, 253, and 254 for inter-chiplet connection. For example, the third interfaces 261, 262, 263, 264, and 265 may include interfaces such as secure joint test action group (secure jtag), general purpose input/output (GPIO), inter integrated circuit (I2C), etc.

The main chiplet may control so that at least a part of the second stage booting process is performed in parallel in at least one sub-chiplet. For example, the main chiplet may load at least a part of the second stage boot firmware (e.g., the fifth boot firmware 271) to at least one sub-chiplet. In this case, the at least one sub-chiplet may perform at least a part of the second stage booting process based on the at least part of the second stage boot firmware loaded. Accordingly, the booting process may be optimized, and thus the booting time may be reduced. For example, after setting the configuration for inter-chiplet connection, the main chiplet may perform an initialization operation required for driving the chiplet system, etc. in parallel with at least one sub-chiplet. The initialization operation required for driving the chiplet system may include an operation of initializing a memory (e.g., DRAM) to load at least one of the application firmware or the operating system, for example.

After completing the booting process, the main chiplet may perform a runtime integrity check on at least one chiplet included in the chiplet system. For example, after loading at least one of the application firmware or the operating system to the memory (e.g., DRAM), the main chiplet may perform the runtime integrity check on the main chiplet and at least one sub-chiplet. The integrity check process will be described below in detail with reference to FIG. 5.

Figure 3:
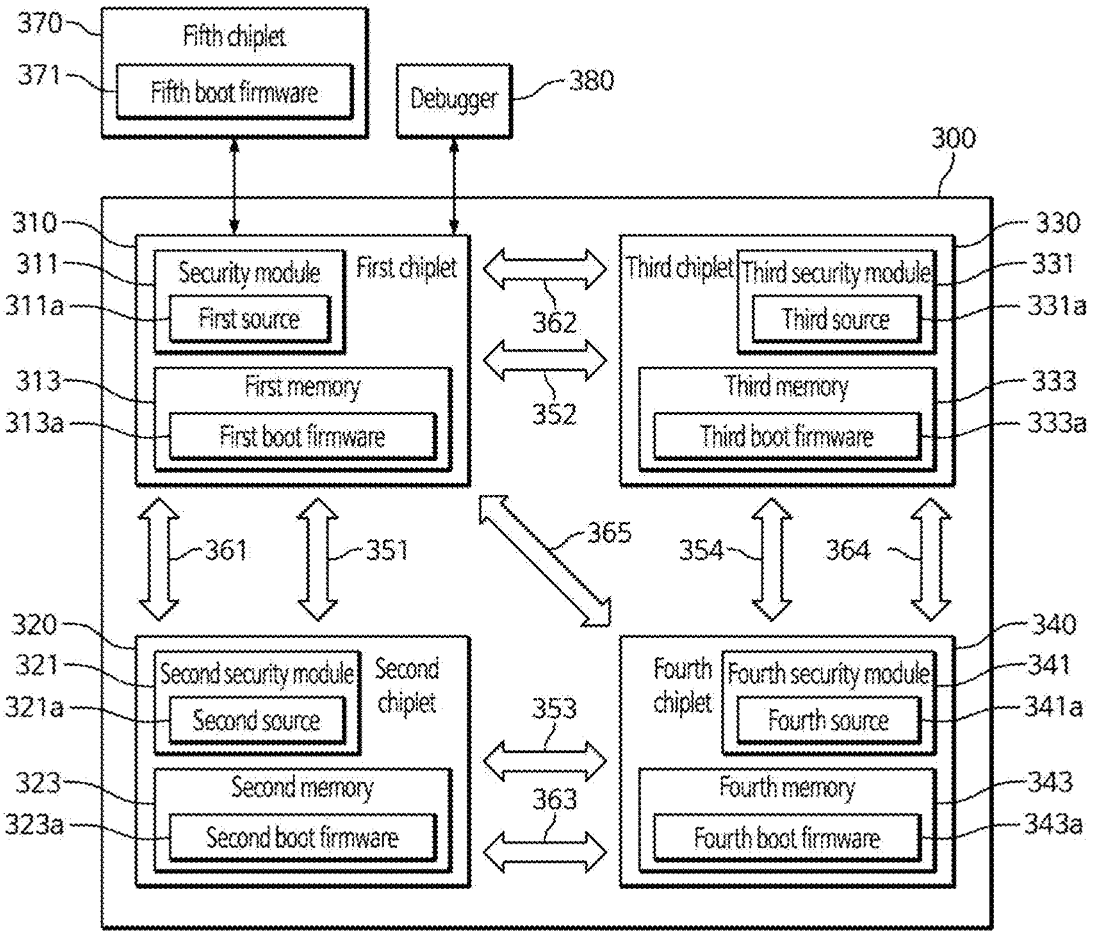
FIG. 3 is a diagram provided to explain a configuration related to the secure booting of an electronic device including a plurality of chiplets.

FIG. 3 is a diagram provided to explain a configuration related to the secure booting of an electronic device including a plurality of chiplets. In FIG. 3, the secure booting of an electronic device 300 (e.g., the electronic device 100 of FIG. 1 or the electronic device 200 of FIG. 2) including a plurality of chiplets (e.g., a first chiplet 310, a second chiplet 320, a third chiplet 330, and/or a fourth chiplet 340), that is, the secure booting of the chiplet system will be described. In the following description, a description for a configuration that is the same as or similar to the configuration already described above in FIG. 2 may be omitted.

Referring to FIG. 3, upon power on and in response to receiving a signal related to booting (e.g., reset signal), the chiplet system may perform a secure booting process. The secure booting process may refer to a process of checking the integrity of a program or software to be executed to enhance the security of the chiplet system. For example, in the secure booting process, the chiplet system may check the integrity of the boot firmware (first boot firmware 313*a*, second boot firmware 323*a*, third boot firmware 333*a*, fourth boot firmware 343*a*, and fifth boot firmware 371) and proceed (or perform) the boot firmware-based booting process only if the integrity check is successful.

The secure booting process may be the same as or similar to the booting process of FIG. 2, except that integrity check is performed on the boot firmware. For example, the secure booting process may also include a first stage secure booting process and a second stage secure booting process.

In the first stage secure booting process, an operation of checking the integrity of the first stage boot firmware (e.g., the first boot firmware 313*a*, the second boot firmware 323*a*, the third boot firmware 333*a*, and the fourth boot firmware 343*a*) may be preferentially performed. For the integrity check on the boot firmware, each of the plurality of chiplets may include a security module (e.g., a first source 311*a*, a second source 321*a*, a third source 331*a*, or a fourth source 341*a*) in which an immutable source (e.g., a first security module 311, a second security module 321, the third security module 331, or a fourth security module 341) is stored. The security module may be physically separated from a main core inside the chiplet. In addition, the security module may include a security core. The immutable source may include an encryption key (or a security key), security data (e.g., a hash value), etc. The immutable source may be included in a root of trust (ROT), and the ROT may manage the secure booting process. For example, the ROT may control so that only the boot firmware that passed integrity check operates on the chiplet system, and if integrity check fails (e.g., if a modification of the boot firmware is identified), the ROT may safely drive the chiplet system through the recovery process.

In the first stage secure booting process, each of the plurality of chiplets may preferentially perform the integrity check of the boot firmware (e.g., the first boot firmware 313*a*, the second boot firmware 323*a*, the third boot firmware 333*a*, or the fourth boot firmware 343*a*) for the first stage secure booting process stored in a memory (e.g., a first memory 313, a second memory 323, a third memory 333, or a fourth memory 343) included in each of the plurality of chiplets. For example, the security module included in each of the plurality of chiplets may use the immutable source to perform the integrity check of the first stage boot firmware, and load and execute the first stage boot firmware if the integrity check is successful. The integrity check process will be described below in detail with reference to FIG. 5.

In the first stage secure booting process, each of the plurality of chiplets may perform initial setting necessary for driving the chiplet in the same or similar manner as the first stage booting process described above with reference to FIG. 2. For example, in the first stage secure booting process, each of the plurality of chiplets may initialize first interfaces 351, 352, 353, and 354 (e.g., the first interfaces 151, 152, 153, and 154 of FIG. 1) for inter-chiplet connection.

Likewise, in the second stage secure booting process, the operation of checking the integrity of the second stage boot firmware (e.g., the fifth boot firmware 371) may be preferentially performed. For example, the security module (e.g., the first security module 311) of the main chiplet (e.g., the first chiplet 310) connectable to the external device may acquire the second stage boot firmware from the memory (e.g., a fifth memory 370) outside the chiplet system and use the immutable source (e.g., the first source 311*a*) to perform the integrity check of the boot firmware for the second stage secure booting process. In addition, the security module of the main chiplet may load and execute the boot firmware for the second stage secure booting process if the integrity check for the second stage boot firmware is successful.

In the second stage secure booting process, the main chiplet may perform settings for performing tasks and functions for connection to the external device, in the same as or similar manner as the second stage booting process described above with reference to FIG. 2. For example, in the second stage secure booting process, the main chiplet may initialize the second interface (e.g., the second interface 161 in FIG. 1) for communication between the external device (e.g., the host device 160 in FIG. 1) and the main chiplet. In addition, in the second stage secure booting process, the main chiplet may set a connection method of the first interfaces 351, 352, 353, and 354 by setting the configuration for inter-chiplet connection. For example, the main chiplet may set a route table including address information for data transmission and reception between chiplets. In addition, in the second stage secure booting process, the main chiplet may initialize the memory (e.g., DRAM) to load at least one of the application firmware or the operating system.

The main chiplet may control so that at least a part of the second stage secure booting process is performed in parallel in at least one sub-chiplet. For example, if the integrity check of the second stage boot firmware (e.g., the fifth boot firmware 371) is successful, the main chiplet may load at least a part of the second stage boot firmware to at least one sub-chiplet. In this case, the at least one sub-chiplet may perform at least a part of the second stage secure booting process based on the at least part of the second stage boot firmware loaded. The at least one sub-chiplet may perform the integrity check on the at least part of the boot firmware for the second stage secure booting process loaded. For example, each security module (e.g., the second security module 321, the third security module 331, or the fourth security module 341) of the at least one sub-chiplet may perform the integrity check on the at least part of the second stage boot firmware loaded, using the immutable source (e.g., the second source 321*a*, the third source 331*a*, or the fourth source 341*a*). As described above, by cross-checking the integrity of the second stage boot firmware, reliability and security of the secure booting of the chiplet system may be increased.

When at least one sub-chiplet performs at least a part of the secure booting process, upon completion of performing the at least part the secure booting process, the at least one sub-chiplet may transmit information (e.g., report) on the execution result to the main chiplet. Alternatively, the main chiplet may monitor the at least one sub-chiplet to monitor the integrity and security situation of the entire secure booting process.

If the modification of the boot firmware is identified, the main chiplet may perform the recovery process for stable driving of the chiplet system. In some aspects, the at least one sub-chiplet may individually perform the recovery process according to the modification situation of at least a part of the integrity-checked boot firmware or the boot firmware. In addition, the chiplet system may use a backup interface (e.g., third interfaces 361, 362, 363, 364, and 365) to configure a secure channel for performing the integrity and health checks on at least one chiplet.

After completing the secure booting process, the main chiplet may perform the runtime integrity check on at least one chiplet included in the chiplet system. For example, after loading at least one of the application firmware or the operating system to the memory (e.g., DRAM, etc.), the main chiplet may perform the runtime integrity check on the main chiplet and at least one sub-chiplet. The integrity check process will be described below in detail with reference to FIG. 5.

If at least one sub-chiplet is identified as heterogeneous chiplets different from the main chiplet, the main chiplet may set different security levels (e.g., the degree of integrity and/or security checks, etc.) of the booting process for the main chiplet and the at least one sub-chiplet. For example, if a plurality of chiplets included in the chiplet system are the homogeneous chiplets, security may be guaranteed, and thus the security level of the booting process may be set to a relatively low level. As another example, if at least one of the plurality of chiplets included in the chiplet system is heterogeneous chiplet, it may be difficult to guarantee security, and thus the security level of the booting process may be set to a relatively high level.

Figure 4:
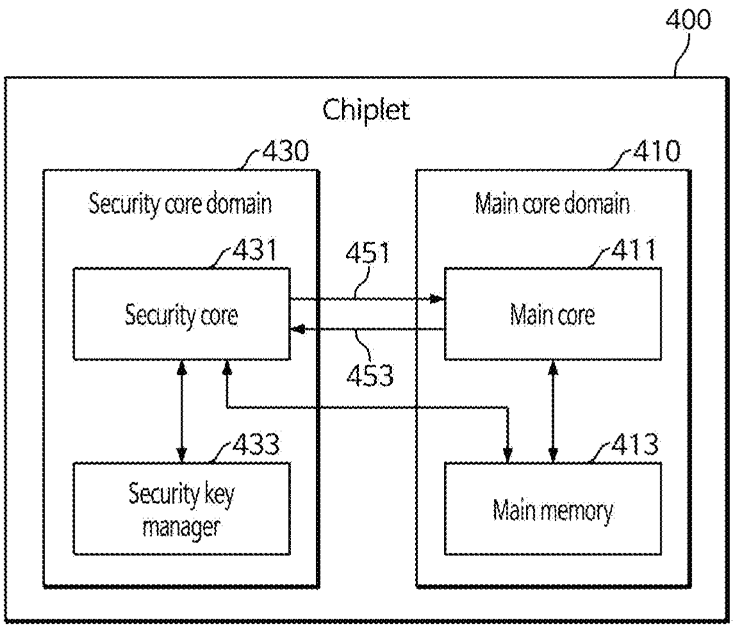
FIG. 4 is a view provided to explain a configuration of the chiplet.

FIG. 4 is a view provided to explain a configuration of the chiplet. Referring to FIG. 4, each of chiplets 400 (e.g., the first chiplets 110, 210, and 310, the second chiplets 120, 220, and 320, the third chiplets 130, 230, and 330 or the fourth chiplets 140, 240, and 340 of FIGS. 1 to 3) included in the chiplet system may include a main core domain 410 and a security core domain 430. The main core domain 410 may include a main core 411 and a main memory 413, and the security core domain 430 may include a security core 431 and an encryption key manager 433. Meanwhile, the configuration of the chiplet 400 is not limited thereto. According to various aspects, the chiplet 400 may omit at least one of the components described above, and may further include at least one other component.

The main core 411 may be a core that performs computational tasks. Additionally or alternatively, the main core 411 may be a core that manages cores that perform computational tasks or that distributes tasks. For example, the main core 411 may load stored data of the main memory 413 and process (e.g., compute) or drive the data. However, the type or function of the main core 411 is not limited thereto.

The main memory 413 may include a volatile memory belonging to the main core domain 410. The main memory 413 may include a memory for storing and/or processing data and/or software during the operation of the main core 411 and the security core 431. That is, data in use may be stored in the main memory 413. The main memory 413 may correspond to a memory to which at least one of the application firmware or the operating system is loaded during the booting process described above with reference to FIG. 2 or the secure booting process described above with reference to FIG. 3. For example, at least one of the application firmware or the operating system may be loaded to the main memory 413.

The main core domain 410 may include the main core 411, and hardware and/or software domains used for the computational tasks of the main core 411. For example, the main core domain 410 may include the main memory 413.

The security core 431 may be a core that performs computational tasks for security purposes. Additionally or alternatively, the security core 431 may be a core that manages cores performing the computational tasks for security purposes or that distributes tasks. For example, the security core 431 may periodically or aperiodically perform an integrity check on at least some of the stored data of the main memory 413. In addition, since the security core 431 should be able to stop the operations of all systems except for the security core 431 when a security-related problem (e.g., integrity check failure) occurs, it may have the highest priority among the cores of the chiplet 400. In this configuration, the security core 431 may be accessible to all components of the chiplet 400.

When accessing the main memory 413, the security core 431 may use direct memory access (DMA) dedicated to the security core to accelerate data traffic.

The encryption key manager 433 may include hardware and/or software that manages encryption keys associated with encryption and/or decryption operations performed by the security core 431. For example, the encryption key manager 433 may be a block responsible for generating and managing encryption keys. The encryption key may be generated through a dedicated core (e.g., a key derivation core) in the encryption key manager 433. The encryption key manager 433 may manage information (e.g., a matching relationship between data and encryption key) on an individual encryption key.

Although not illustrated, there may be a separate memory in the security core domain 430. In a memory in the security core domain 430, there may be an area for storing an encryption key (e.g., a key generated by the encryption key manager 433 or a key transmitted from outside the system) and individual encryption key information. Access to this area may be available only to the encryption key manager 433. Additionally or alternatively, a memory dedicated to the encryption key manager 433 may be included in the encryption key manager 433, and the encryption key and the individual encryption key information may be stored in the memory. The encryption key and the individual encryption key information, etc. may correspond to the immutable source (e.g., the first source 311*a*, the second source 321*a*, the third source 331*a*, or the fourth source 341*a*) described above with reference to FIG. 3. In addition, in FIG. 4, the encryption key manager 433 is illustrated as a separate component from the security core 431, but this is for convenience of explanation, and aspects are not limited thereto. At least some components of the encryption key manager 433 may be included in the security core 431. At least some components included in the security core domain 430 (e.g., at least some components of the security core 431 and/or at least some components of the encryption key manager 433) may correspond to the security modules (e.g., the first security module 311, the second security module 321, the third security module 331, or the fourth security module 341) described above with reference to FIG. 3.

The security core domain 430 may include the security core 431 and hardware and/or software domains to be used for the computational tasks of the security core 431. The security core domain 430 may include the encryption key manager 433. Since the security core domain 430 is an area where the security-related tasks are performed, the other components inside and outside the system, except for the security core 431, can access the security core 431 only for limited purposes such as transmitting an access request for encrypted data, and access to the security core domain 430 for all the other purposes may be limited.

A security main interconnection 451 may transmit data and/or control signals between the security core 431 and/or the main core 411. In this case, the security core 431 may have a higher priority than the main core 411. Accordingly, the security core 431 may access all parts of the main core 411 and may also instruct the main core 411 to or not to operate. Accordingly, if a security-related problem occurs, the security core 431 may stop the operation of the main core 411 and have authorization to control over the entire system. As a result, the security core 431 may smoothly perform the system protection and/or recovery process, if modification of data (e.g., boot firmware) is detected in the integrity check process.

A main security interconnection 453 may transmit data and control signals between the main core 411 and the security core 431. In this case, the main core 411 may access only a limited part of the security core 431 through the main security interconnection 453. Accordingly, the security of the security core 431 responsible for security can be maintained, and the risk of modification of the chiplet 400 can be prevented.

Figure 5:
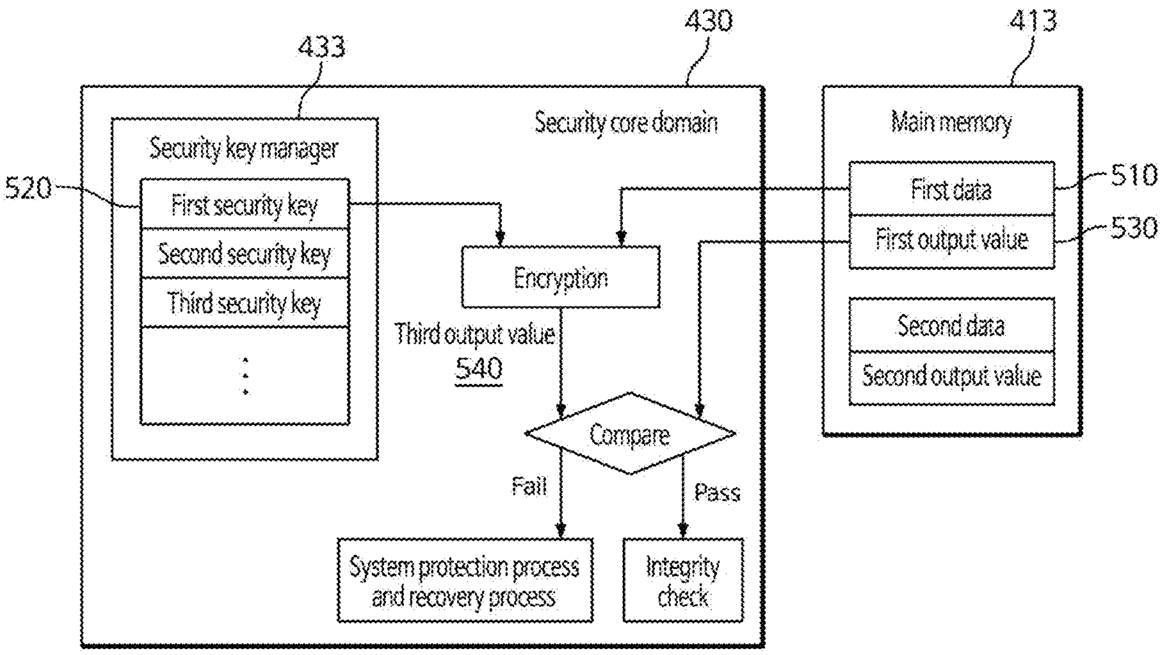
FIG. 5 is a diagram provided to explain a configuration for performing integrity check in the chiplet.

FIG. 5 is a diagram provided to explain a configuration for performing integrity check in the chiplet. Referring to FIG. 5, the security core (e.g., the security core 431 of FIG. 4) may periodically or aperiodically perform integrity check on data stored in the main memory 413. For example, the security core may perform integrity check of the boot firmware stored in the main memory 413 in the booting process. As another example, the security core may perform runtime integrity check on the data stored in the main memory 413. The encryption keys used for the integrity check may be managed by the encryption key manager 433 in the security core domain 430 accessible to the security core. The encryption key manager 433 may be accessible only to the security core, and may not be accessible to the components other than the security core inside and outside the system.

The security core may perform the integrity check on only some data of the stored data of the main memory 413. For example, the security core may perform the integrity check on data that is not frequently updated and is mainly reused, that is, on data having a read-only characteristic. As a specific example, the data having read-only characteristics may include firmware (e.g., boot firmware), page tables, and/or parameters of a trained machine learning model (e.g., kernel data of a trained neural network), etc., but is not limited thereto.

The security core may use a one-way encryption algorithm for the integrity check. The one-way encryption algorithm may be an algorithm which ensures that an output value is changed when an input value is changed, and for which it is very difficult or impossible to do an inverse operation to derive the input value from the output value. Any of the known one-way encryption algorithms may be used for the integrity check. For example, the one-way encryption algorithm may include hash algorithms such as CRC, MD5, RIPEMD160, SHA-1, SHA-256, SHA-384, and SHA-512, but is not limited thereto. Hereinafter, "output value" may refer to an output value of an encryption algorithm output in response to inputting data and an encryption key to the one-way encryption algorithm.

FIG. 3 illustrates an example of performing an integrity check on first data 510 stored in the main memory 413. In the illustrated example, the first data 510 is stored in the main memory 413 in association with a first output value 530 that is generated by using an one-way encryption algorithm based on a first encryption key 520 managed by the encryption key manager 433. For example, the first output value 530 may be a hash value output in response to inputting the first data 510 and the first encryption key 520 to a hash algorithm. Matching information, which indicates that the first data 510 and the first encryption key 520 are associated with each other, may be managed by the encryption key manager 433 in the security core domain 430.

There may be various sources of the first data 510 stored in the main memory 413. For example, the first data 510 may be data loaded from non-volatile memory accessible to the security core, data processed and generated by the main core (e.g., the main core 411 of FIG. 4), or data received by the host device (e.g., the host device 160 of FIG. 1). For example, the first data 510 may include the first stage boot firmware loaded from the non-volatile memories (e.g., the first memories 211 and 313, the second memories 221 and 323, the third memories 231 and 333, or the fourth memories 241 and 343 of FIGS. 2 and 3) inside the chiplet (e.g., the chiplet 400 of FIG. 4). As another example, the first data 510 may include the second stage boot firmware loaded from a non-volatile memory (e.g., the fifth memories 270 and 370 of FIGS. 2 and 3) outside the chiplet. The process of storing the first data 510 in the main memory 413 may vary depending on the source of the first data 510. If the first data 510 is the data loaded from a non-volatile memory accessible to the security core or if the first data 510 is the data received from the host device, the security core may first perform a preliminary iIntegrity check on the first data 510 and then store the first data 510 in the main memory 413.

For the integrity check, first, the security core may generate, by using a one-way encryption algorithm, a third output value 540 for the first data 510 based on the first data 510 and the first encryption key 520 stored in the main memory 413. For example, the first output value 530 may be a hash value output in response to the security core inputting the first data 510 and the first encryption key 520 to a hash algorithm. When loading data from the main memory 413 or storing data in the main memory 413, the security core may use the DMA dedicated to the security core to accelerate data traffic.

The security core may compare the stored first output value 530 with the generated third output value 540 to check for possible modification of the first data 510 stored in the main memory 413. The security core may periodically or aperiodically perform this integrity check.

If the result of checking for possible modification reveals that the first output value 530 and the third output value 540 do not match with each other, it may be determined that the first data 510 stored in the main memory 413 has been modified. If it is determined that the first data 510 is modified, the security core may perform a system protection process and a recovery process. The method for performing the system protection process and the recovery process by the security core will be described below in detail with reference to FIGS. 12 and 13. If the first output value 530 and the third output value 540 match with each other, the integrity of the first data 510 stored in the main memory 413 may be confirmed.

If the same key is continuously used for integrity check, there is a possibility of exposure to security risks. In order to prevent the exposure to security risks, the security core may periodically change an encryption key and regenerate and store an output value. For example, the security core may generate, by using a one-way encryption algorithm, a new output value based on the first data 510 and the second encryption key managed by the encryption key manager 433, and store the new output value in the main memory 413 in association with the first data 510.

The security core may use a public key encryption algorithm (or an asymmetric key encryption algorithm) (e.g., ECDSA-384, etc.) as an encryption algorithm for the integrity check. For example, first, the security core may perform a hash operation on the first data 510 (e.g., boot firmware). The security core may use a public key encryption algorithm to encrypt the result value of the hash operation with a private key. The encrypted result value may indicate a digital signature, and may be stored in the main memory 413 in association with the first data 510. The security core may perform the hash operation on the first data 510 again, and decrypt the stored digital signature associated with the first data 510 with a public key. In this case, if the result value of the hash operation matches the decoded result value, the integrity of the first data 510 stored in the main memory 413 may be confirmed. Alternatively, if the result value of the hash operation does not match the decoded result value, it may be determined hat the first data 510 stored in the main memory 413 has been modified, and in this case, the security core may perform the system protection process and the recovery process.

Figure 6:
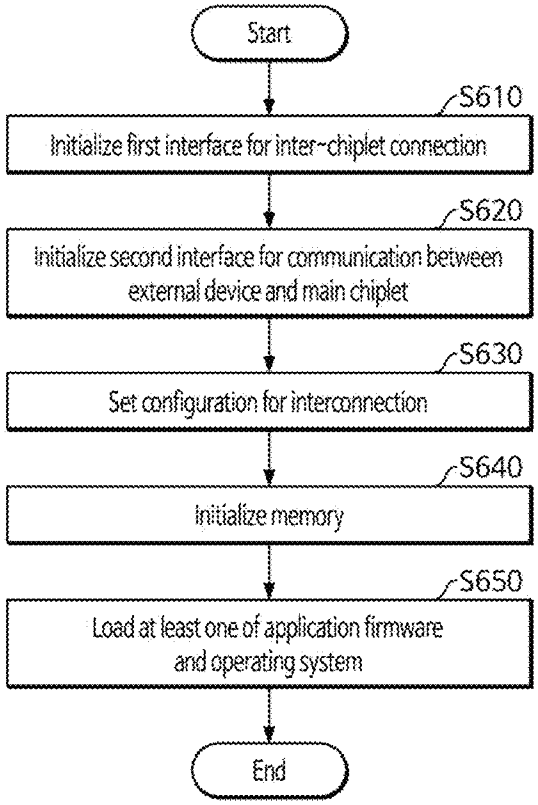
FIG. 6 is a diagram provided to explain a method for booting an electronic device including a plurality of chiplets.

FIG. 6 is a diagram provided to explain a method for booting an electronic device including a plurality of chiplets. Referring to FIG. 6, an electronic device (e.g., the electronic devices 100, 200, 300, and 400 of FIGS. 1 to 4) including a plurality of chiplets (e.g., the first chiplets 110, 210, and 310, the second chiplets 120, 220, and 320, the third chiplets 130, 230, and 330 and/or the fourth chiplets 140, 240, and 340 of FIGS. 1 to 3 or the chiplet 400 of FIG. 4)), that is, the chiplet system may initialize a first interface (e.g., the first interface 151, 152, 153, and 154 of FIG. 1, the first interface 251, 252, 253, and 254 of FIG. 2, or the first interface 351, 352, 353, and 354 of FIG. 3) for inter-chiplet connection, at S610. The first interface may include UCIe, etc. as a die-to-die interface. The operation at S610 may be included in the first stage booting process. The first stage booting process may be performed by the execution of the first stage boot firmware stored in the memory (e.g., non-volatile memory) included in each of the plurality of chiplets. For example, the operation at S610 may be performed in parallel in each of the plurality of chiplets. In addition, the main chiplet of the plurality of chiplets may proceed to the operation at S620 after performing the operation at S610, and the sub-chiplet of the plurality of chiplets may be switched to the standby state after performing the operation at S610.

At S620, the chiplet system may initialize a second interface (e.g., the second interface 161 in FIG. 1) for communication between an external device (e.g., the host device 160 in FIG. 1) and the main chiplet. The second interface may refer to the host interface, and may include PCIe, etc., for example. The operations at and after S620 may be included in the second stage booting process. The second stage booting process may be performed by the execution of the second stage boot firmware stored in the memory (e.g., non-volatile memory) outside the chiplet system. For example, the main chiplet of the plurality of chiplets may load the second stage boot firmware from an external memory to the chiplet system and execute the same. The operation at S620 may be performed in the main chiplet of the plurality of chiplets. For example, in the second stage booting process, the main chiplet may initialize the second interface for communication between the external device and the main chiplet.

At S630, the chiplet system may set configuration for inter-chiplet connection. The configuration may include address information for data transmission and reception between chiplets. For example, the configuration may include a route table. That is, through the configuration for inter-chiplet connection, the chiplet system may set a connection method of the first interface for the inter-chiplet connection. The operation at S630 may be performed in the main chiplet of the plurality of chiplets. For example, in the second stage booting process, the main chiplet may set configuration for inter-chiplet connection.

At S640, the chiplet system may initialize the memory. The memory may be a memory to which at least one of the application firmware or the operating system is to be loaded. For example, the memory may include a volatile memory. The operation at S640 may be performed in, of the plurality of chiplets, the main chiplet or the main chiplet and at least one sub-chiplet in parallel. For example, each of the main chiplet and at least one sub-chiplet may initialize an internal volatile memory (e.g., DRAM).

At S650, the chiplet system may load at least one of the application firmware or the operating system. For example, the main chiplet may load at least one of the application firmware or the operating system to the memory initialized at S640.

Figure 7:
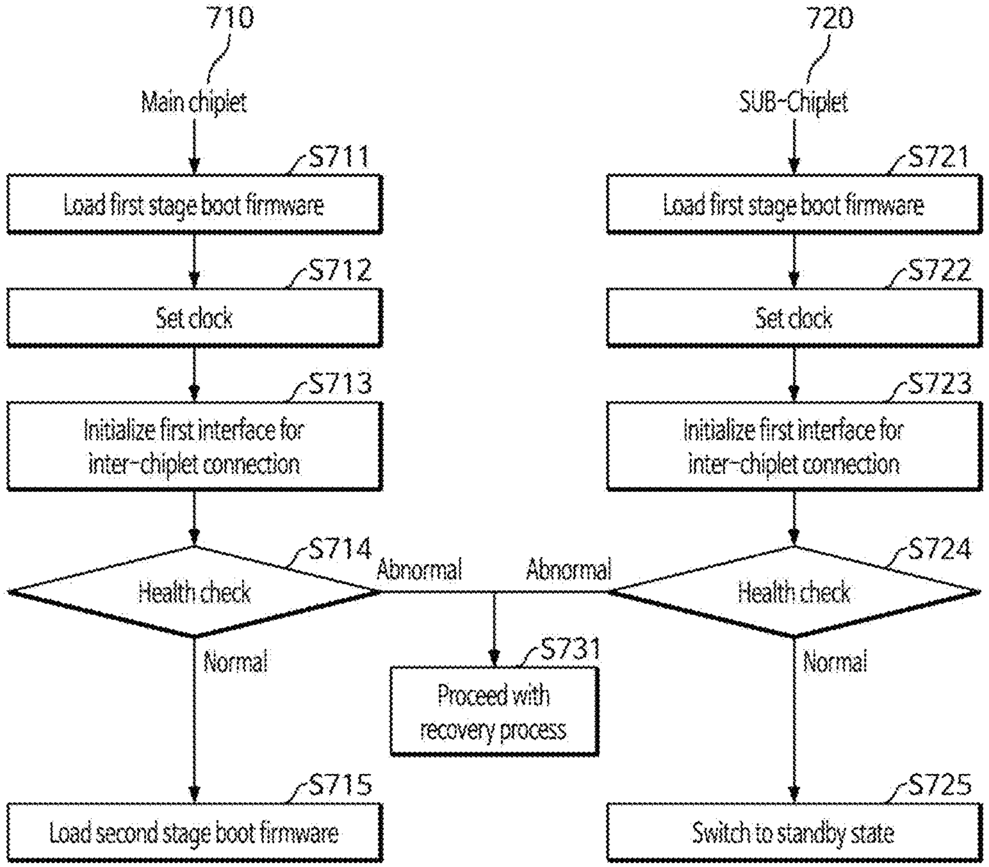
FIG. 7 is a diagram provided to explain a method for performing the first stage booting process in each chiplet.

FIG. 7 is a diagram provided to explain a method for performing the first stage booting process in each chiplet. Referring to FIG. 7, a main chiplet 710 (e.g., the first chiplets 110, 210, and 310 of FIGS. 1 to 3 or the chiplets 400 of FIG. 4) may load the first stage boot firmware (e.g., the first boot firmware 211*a* and 313*a* of FIGS. 2 and 3) at S711. For example, the main chiplet 710 may load the first stage boot firmware stored in the non-volatile memory (e.g., the first memories 211 and 313 of FIGS. 2 and 3) inside the main chiplet 710 to the volatile memory inside the main chiplet 710.

At S712, the main chiplet 710 may set a clock. For example, the main chiplet 710 may perform a PLL control operation for adjusting a clock frequency. If a PLL control operation of increasing the clock frequency is performed, a high-speed operation of a die of the main chiplet 710 may be possible.

At S713, the main chiplet 710 may initialize the first interfaces (e.g., the first interfaces 151, 152, 251, 252, 351, and 352 of FIGS. 1 to 3) for inter-chiplet connection. The first interface may include UCIe, etc. as a die-to-die interface.

At S714, the main chiplet 710 may perform a health check. For example, the main chiplet 710 may monitor hardware components included in the main chiplet 710 to check the state of power supply, temperature, voltage, current, memory, etc.

If the result of the check indicates normal state, at S715, the main chiplet 710 may load the second stage boot firmware (e.g., the fifth boot firmware 271 and 371 of FIGS. 2 and 3). For example, the main chiplet 710 may load the second stage boot firmware stored in the non-volatile memories (e.g., the fifth memories 270 and 370 of FIGS. 2 and 3) outside the chiplet system to the volatile memory inside the main chiplet 710.

If the result of the check indicates an abnormal state (e.g., error or abnormality occurs), at S731, the main chiplet 710 may proceed with the recovery process. The recovery process will be described below in detail with reference to FIGS. 12 and 13.

Meanwhile, a sub-chiplet 720 (e.g., the second chiplets 120, 220, and 320, the third chiplets 130, 230, and 330, or the fourth chiplets 140, 240, and 340 of FIGS. 1 to 3, or the chiplet 400 of FIG. 4) may load the first stage boot firmware (e.g., the second boot firmware 221*a* and 323*a*, the third boot firmware 231*a* and 333*a*, or the fourth boot firmware 241*a* and 343*a* of FIGS. 2 to 3), at S721. For example, the sub-chiplet 720 may load the first stage boot firmware stored in the non-volatile memories (e.g., the second memories 221 and 323, the third memories 231 and 333, or the fourth memories 241 and 343 of FIGS. 2 and 3) inside the sub-chiplet 720 to the volatile memory inside the sub-chiplet 720.

At S722, the sub-chiplet 720 may set a clock. For example, the sub-chiplet 720 may perform a PLL control operation for adjusting a clock frequency. If a PLL control operation of increasing the clock frequency is performed, a high-speed operation of a die of the sub-chiplet 720 may be possible.

At S723, the sub-chiplet 720 may initialize the first interfaces (e.g., the first interfaces 151 to 154, 251 to 254, and 351 to 354 of FIGS. 1 to 3) for inter-chiplet connection. The first interface may include UCIe, etc. as a die-to-die interface.

At S724, the sub-chiplet 720 may perform a health check. For example, the sub-chiplet 720 may monitor hardware components included in the sub-chiplet 720 to check the state of power supply, temperature, voltage, current, memory, etc.

If the result of the check indicates a normal state, at S725, the sub-chiplet 720 may be switched to the standby state. For example, the sub-chiplet 720 may be switched to the standby state for receiving a command from the main chiplet 710.

If the result of the check indicates an abnormal state (e.g., error or abnormality occurs), at S731, the sub-chiplet 720 may proceed with the recovery process.

In the first stage booting process described above, each of the plurality of chiplets may proceed in parallel. For example, the operations S711 to S715 by the main chiplet 710 and the operations S721 to S725 by the sub-chiplet 720 may be performed in parallel.

Figure 8:
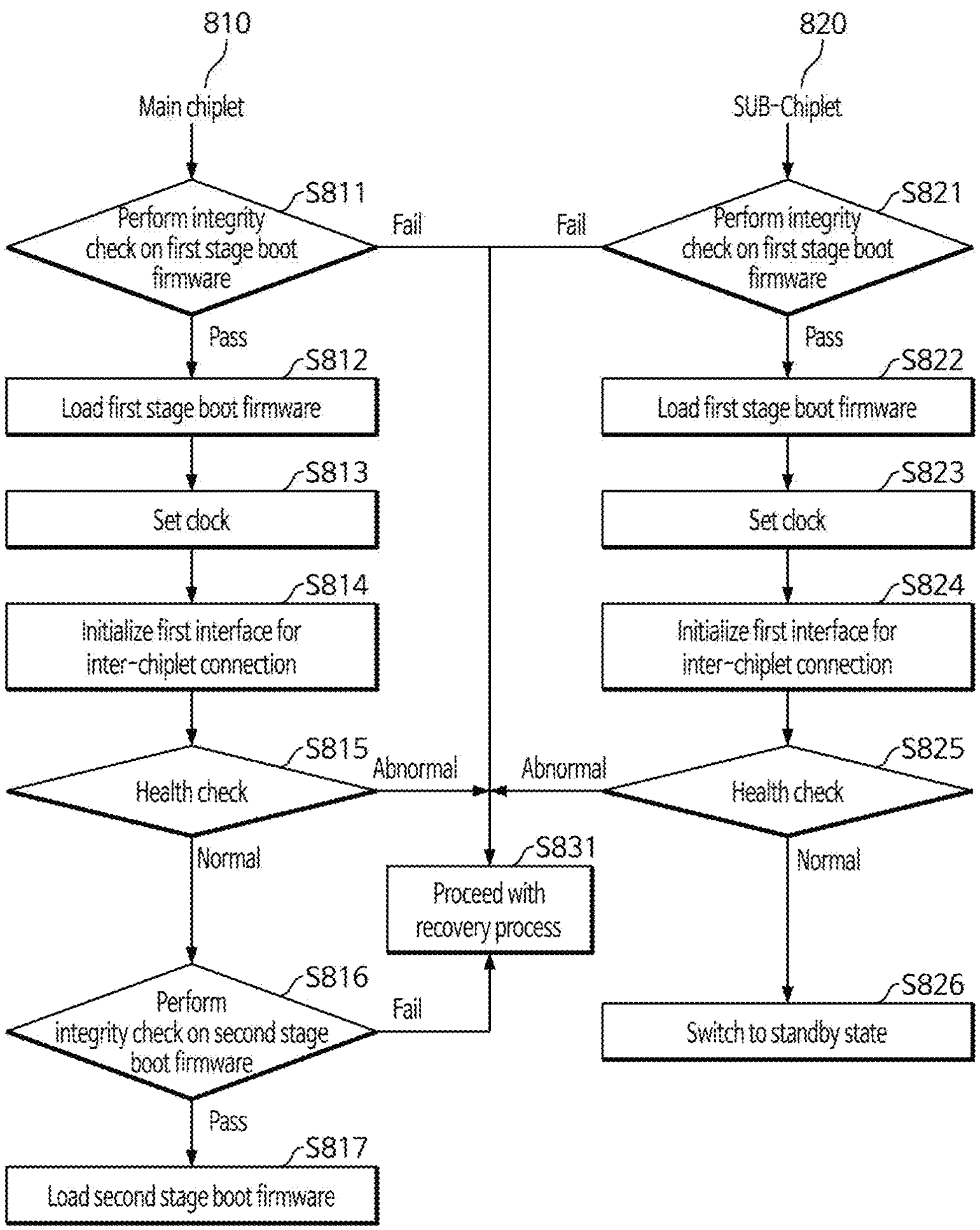
FIG. 8 is a diagram provided to explain a method for performing the first stage secure booting process in each chiplet.

FIG. 8 is a diagram provided to explain a method for performing the first stage secure booting process in each chiplet. Referring to FIG. 8, a main chiplet 810 (e.g., the first chiplets 110, 210, and 310 of FIGS. 1 to 3 or the chiplets 400 of FIG. 4) may perform the integrity check on the first stage boot firmware (e.g., the first boot firmware 211*a* and 313*a* of FIGS. 2 and 3), at S811. For example, the main chiplet 810 may perform the integrity check of the first stage boot firmware using the immutable source (e.g., the first source 311*a* of FIG. 3) stored in the security module (e.g., the first security module 311*a* of FIG. 3) included in the main chiplet 810. The integrity check process may be the same as or similar to that described above with reference to FIG. 5.

If the integrity check of the first stage boot firmware is successful, the main chiplet 810 may load the first stage boot firmware, at S812. For example, the main chiplet 810 may load the first stage boot firmware stored in the non-volatile memory (e.g., the first memories 211 and 313 of FIGS. 2 and 3) inside the main chiplet 810 to the volatile memory inside the main chiplet 810.

If the integrity check of the first stage boot firmware fails, the main chiplet 810 may proceed with the recovery process, at S831. The recovery process will be described below in detail with reference to FIGS. 12 and 13.

At S813, the main chiplet 810 may set a clock. For example, the main chiplet 810 may perform a PLL control operation for adjusting a clock frequency. If a PLL control operation of increasing the clock frequency is performed, a high-speed operation of a die of the main chiplet 810 may be possible.

At S814, the main chiplet 810 may initialize the first interfaces (e.g., the first interfaces 151, 152, 251, 252, 351, and 352 of FIGS. 1 to 3) for inter-chiplet connection. The first interface may include UCIe, etc. as a die-to-die interface.

At S815, the main chiplet 810 may perform a health check. For example, the main chiplet 810 may monitor hardware components included in the main chiplet 810 to check the state of power supply, temperature, voltage, current, memory, etc.

If the result of the check indicates a normal state, the main chiplet 810 may perform the integrity check on the second stage boot firmware (e.g., the fifth boot firmware 271 and 371 of FIGS. 2 and 3), at S816. For example, the main chiplet 810 may perform the integrity check of the second stage boot firmware using the immutable source stored in the security module included in the main chiplet 810.

If the result of the check indicates an abnormal state (e.g., error or abnormality occurs), at S831, the main chiplet 810 may proceed with the recovery process.

If the integrity check of the second stage boot firmware is successful, the main chiplet 810 may load the second stage boot firmware, at S817. For example, the main chiplet 810 may load the second stage boot firmware stored in the non-volatile memories (e.g., the fifth memories 270 and 370 of FIGS. 2 and 3) outside the chiplet system to the volatile memory inside the main chiplet 810.

If the integrity check of the second stage boot firmware fails, the main chiplet 810 may proceed with the recovery process, at S831.

Meanwhile, a sub-chiplet 820 (e.g., the second chiplets 120, 220, and 320, the third chiplets 130, 230, and 330, or the fourth chiplets 140, 240, and 340 of FIGS. 1 to 3, or the chiplet 400 of FIG. 4) may perform the integrity check on the first stage boot firmware (e.g., the second boot firmware 221*a* and 323*a*, the third boot firmware 231*a* and 333*a*, or the fourth boot firmware 241*a* and 343*a* of FIGS. 2 to 3), at S821. For example, the sub-chiplet 820 may perform the integrity check of the first stage boot firmware using the immutable source (e.g., the second source 321*a*, the third source 331*a*, or the fourth source 341*a* of FIG. 3) stored in the security module (e.g., the second security module 321, the third security module 331, or the fourth security module 341 of FIG. 3) included in the sub-chiplet 820.

If the integrity check of the first stage boot firmware is successful, the sub-chiplet 820 may load the first stage boot firmware, at S822. For example, the sub-chiplet 820 may load the first stage boot firmware stored in the non-volatile memories (e.g., the second memories 221 and 323, the third memories 231 and 333, or the fourth memories 241 and 343 of FIGS. 2 and 3) inside the sub-chiplet 820 to the volatile memory inside the sub-chiplet 820.

If the integrity check of the first stage boot firmware fails, the sub-chiplet 820 may proceed with the recovery process, at S831.

At S823, the sub-chiplet 820 may set a clock. For example, the sub-chiplet 820 may perform a PLL control operation for adjusting a clock frequency. If a PLL control operation of increasing the clock frequency is performed, a high-speed operation of a die of the sub-chiplet 820 may be possible.

At S824, the sub-chiplet 820 may initialize the first interfaces (e.g., the first interfaces 151 to 154, 251 to 254, and 351 to 354 of FIGS. 1 to 3) for inter-chiplet connection. The first interface may include UCIe, etc. as a die-to-die interface.

At S825, the sub-chiplet 820 may perform a health check. For example, the sub-chiplet 820 may monitor hardware components included in the sub-chiplet 820 to check the state of power supply, temperature, voltage, current, memory, etc.

If the result of the check indicates a normal state, at S826, the sub-chiplet 820 may be switched to the standby state. For example, the sub-chiplet 820 may be switched to the standby state for receiving a command from the main chiplet 810.

If the result of the check indicates an abnormal state (e.g., error or abnormality occurs), at S831, the sub-chiplet 820 may proceed with the recovery process.

In the first stage secure booting process described above, each of the plurality of chiplets may proceed in parallel. For example, the operations S811 to S817 by the main chiplet 810 and the operations S821 to S826 by the sub-chiplet 820 may be performed in parallel.

Figure 9:
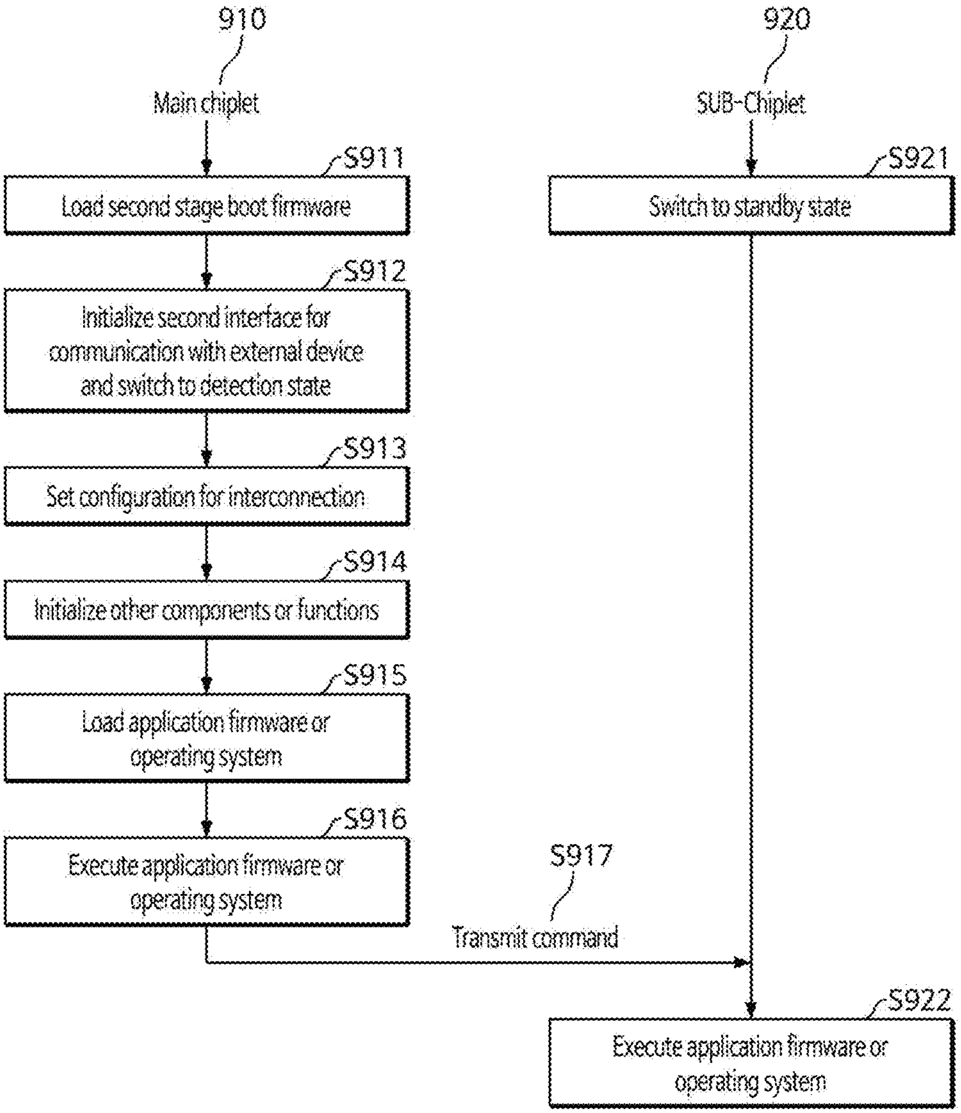
FIG. 9 is a diagram provided to explain a method for performing the second stage booting process in each chiplet.

FIG. 9 is a diagram provided to explain a method for performing the second stage booting process in each chiplet. The second stage booting process described below with reference to FIG. 9 may be performed after the first stage booting process described above with reference to FIG. 7 or the first stage secure booting process described above with reference to FIG. 8 is performed.

Referring to FIG. 9, a main chiplet 910 (e.g., the first chiplets 110, 210, and 310 of FIGS. 1 to 3 or the chiplets 400 of FIG. 4) may load the second stage boot firmware (e.g., the fifth boot firmware 271 and 371 of FIGS. 2 and 3), at S911. For example, the main chiplet 910 may load the second stage boot firmware stored in the non-volatile memories (e.g., the fifth memories 270 and 370 of FIGS. 2 and 3) outside the chiplet system to the volatile memory inside the main chiplet 910. In this case, a sub-chiplet 920 (e.g., the second chiplets 120, 220, and 320, the third chiplets 130, 230, and 330, or the fourth chiplet 140, 240, and 340 of FIGS. 1 to 3 or the chiplet 400 of FIG. 4) may have been switched to the standby state. For example, at S921, the sub-chiplet 920 may be switched to the standby state for receiving a command of the main chiplet 910. The operation at S911 may correspond to the operation at S715 of FIG. 7 or the operation at S817 of FIG. 8, and the operation at S921 may correspond to the operation at S725 of FIG. 7 or the operation at S826 of FIG. 8.

At S912, the main chiplet 910 may initialize a second interface (e.g., the second interface 161 of FIG. 1) for communication with an external device and may switch to a detection state. The second interface may refer to the host interface, and may include PCIe, etc., for example. For example, by initializing the PCIe interface, the main chiplet 910 may support the host device outside the chiplet system (e.g., the host device 160 in FIG. 1) (or host system) to recognize the chiplet system, which is a PCIe device, within a predetermined time limit. In addition, after initializing the PCIe interface, the main chiplet 910 may switch the LTSSM to the detection state to detect a link related to the connection of the device through the PCIe interface.

At S913, the main chiplet 910 may set the configuration for inter-chiplet connection. The configuration may include address information for data transmission and reception between chiplets. For example, the configuration may include a route table. That is, through the configuration for inter-chiplet connection, the main chiplet 910 may set a connection method of the first interfaces (e.g., the first interfaces 151 to 154, 251 to 254, and 351 to 354 of FIGS. 1 to 3) for inter-chiplet connection.

At S914, the main chiplet 910 may initialize the other components or functions. For example, the main chiplet 910 may perform an initialization operation required for driving the chiplet system. The initialization operation required for driving the chiplet system may include an operation of initializing a memory (e.g., DRAM) to load at least one of the application firmware or the operating system, for example.

At S915, the main chiplet 910 may load at least one of the application firmware or the operating system. For example, at S915, the main chiplet 910 may load at least one of the application firmware or the operating system to the initialized memory.

At S916, the main chiplet 910 may execute at least one of the application firmware or the operating system. For example, the main chiplet 910 may execute at least one of the application firmware or the operating system loaded to the memory. In addition, if necessary, while executing at least one of the application firmware or the operating system, the main chiplet 910 may transmit a command to the sub-chiplet 920, as illustrated in S917. In this case, the sub-chiplet 920 receiving the command may execute at least one of the application firmware or the operating system based on the received command, at S922. For example, the sub-chiplet 920 may execute at least one of the application firmware or the operating system in parallel or in connection with the main chiplet 910.

FIG. 9 illustrates an example in which the second stage booting process (or the second stage secure booting process) is performed solely by the main chiplet, but aspects are not limited thereto. As will be described below with reference to FIG. 10 or 11, the second stage booting process (or the second stage secure booting process) may be performed by the main chiplet and the at least one sub-chiplet in parallel.

Figure 10:
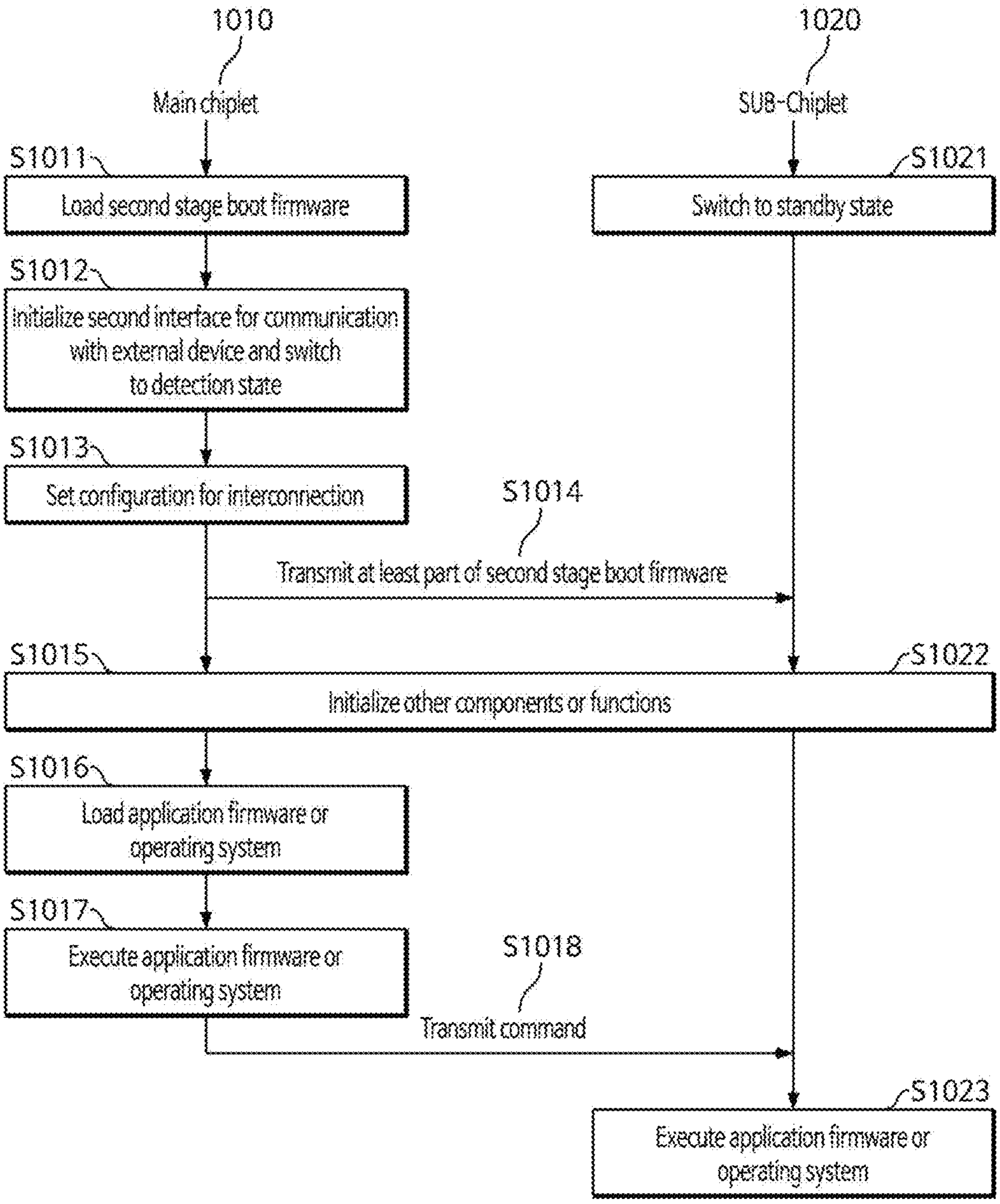
FIG. 10 is a diagram provided to explain another method for performing the second stage booting process in each chiplet.

FIG. 10 is a diagram provided to explain another method for performing the second stage booting process in each chiplet. The second stage booting process described below with reference to FIG. 10 may be performed after the first stage booting process described above with reference to FIG. 7 or the first stage secure booting process described above with reference to FIG. 8 is performed.

Referring to FIG. 10, a main chiplet 1010 (e.g., the first chiplets 110, 210, and 310 of FIGS. 1 to 3 or the chiplets 400 of FIG. 4) may load the second stage boot firmware (e.g., the fifth boot firmware 271 and 371 of FIGS. 2 and 3), at S1011. For example, the main chiplet 1010 may load the second stage boot firmware stored in the non-volatile memories (e.g., the fifth memories 270 and 370 of FIGS. 2 and 3) outside the chiplet system to the volatile memory inside the main chiplet 1010. In this case, a sub-chiplet 1020 (e.g., the second chiplets 120, 220, and 320, the third chiplets 130, 230, and 330, or the fourth chiplet 140, 240, and 340 of FIGS. 1 to 3 or the chiplet 400 of FIG. 4) may have been switched to the standby state. For example, at S1021, the sub-chiplet 1020 may be switched to the standby state for receiving a command of the main chiplet 1010. The operation at S1011 may correspond to the operation at S715 of FIG. 7 or the operation at S817 of FIG. 8, and the operation at S1021 may correspond to the operation at S725 of FIG. 7 or the operation at S826 of FIG. 8.

At S1012, the main chiplet 1010 may initialize a second interface (e.g., the second interface 161 of FIG. 1) for communication with an external device and may switch to a detection state. The second interface may refer to the host interface, and may include PCIe, etc., for example. For example, by initializing the PCIe interface, the main chiplet 1010 may support the host device outside the chiplet system (e.g., the host device 160 in FIG. 1) (or host system) to recognize the chiplet system, which is a PCIe device, within a predetermined time limit. In addition, after initializing the PCIe interface, the main chiplet 1010 may switch the LTSSM to the detection state to detect a link related to the connection of the device through the PCIe interface.

At S1013, the main chiplet 1010 may set the configuration for inter-chiplet connection. The configuration may include address information for data transmission and reception between chiplets. For example, the configuration may include a route table. That is, through the configuration for inter-chiplet connection, the main chiplet 1010 may set a connection method of the first interfaces (e.g., the first interfaces 151 to 154, 251 to 254, and 351 to 354 of FIGS. 1 to 3) for inter-chiplet connection.

After the configuration for inter-chiplet connection is set, the main chiplet 1010 may transmit at least a part of the second stage boot firmware to the sub-chiplet 1020, as illustrated in S1014. At S1015 and S1022, the main chiplet 1010 and the sub-chiplet 1020 may perform initialization of the other components or functions in parallel. For example, the main chiplet 1010 may load at least a part of the second stage boot firmware to at least one sub-chiplet 1020, and the at least one sub-chiplet 1020 may perform at least a part of the second stage booting process based on the at least part of the second stage boot firmware loaded. Accordingly, the booting process may be optimized, and thus the booting time may be reduced. For example, after setting the configuration for inter-chiplet connection, the main chiplet 1010 may perform an initialization operation required for driving the chiplet system, etc. in parallel with the at least one sub-chiplet 1020. The initialization operation required for driving the chiplet system may include an operation of initializing a memory (e.g., DRAM) to load at least one of the application firmware or the operating system, for example.

At S1016, the main chiplet 1010 may load at least one of the application firmware or the operating system. For example, the main chiplet 1010 may load at least one of the application firmware or the operating system to the memory initialized at S1015.

At S1017, the main chiplet 1010 may execute at least one of the application firmware or the operating system. For example, the main chiplet 1010 may execute at least one of the application firmware or the operating system loaded to the memory. In addition, if necessary, while executing at least one of the application firmware or the operating system, the main chiplet 1010 may transmit a command to the sub-chiplet 1020, as illustrated in S1018. In this case, the sub-chiplet 1020 receiving the command may execute at least one of the application firmware or the operating system based on the received command, at S1023. For example, the sub-chiplet 1020 may execute at least one of the application firmware or the operating system in parallel or in connection with the main chiplet 1010.

Figure 11:
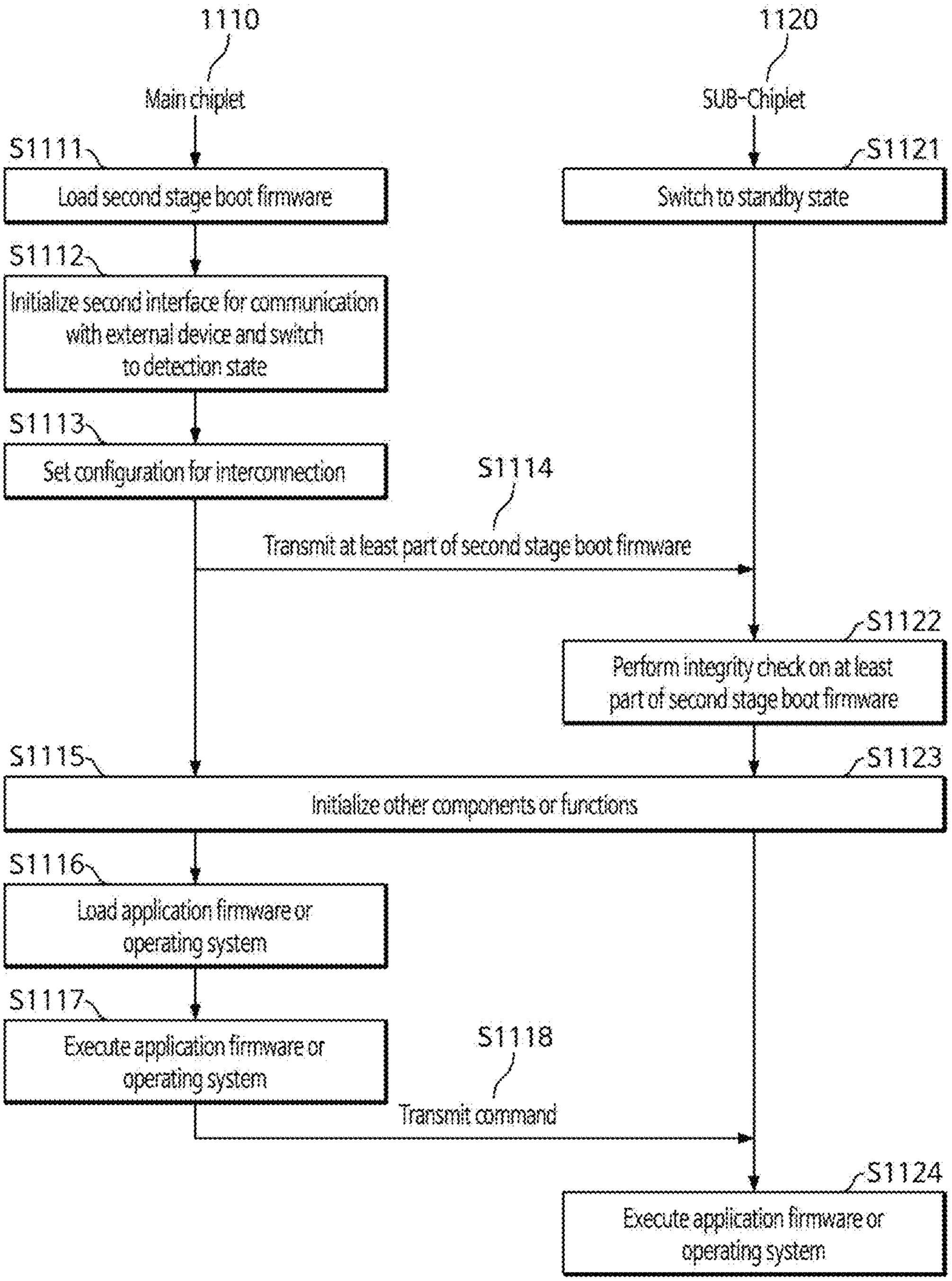
FIG. 11 is a diagram provided to explain a method for performing the second stage secure booting process in each chiplet.

FIG. 11 is a diagram provided to explain a method for performing the second stage secure booting process in each chiplet. The second stage secure booting process described with reference to FIG. 11 is similar to the second stage booting process described with reference to FIG. 10, except for an operation (e.g., S1122) that may be added to increase security. In addition, the second stage secure booting process described below with reference to FIG. 11 may be performed after the first stage secure booting process described above with reference to FIG. 8 is performed.

Referring to FIG. 11, a main chiplet 1110 (e.g., the first chiplets 110, 210, and 310 of FIGS. 1 to 3 or the chiplets 400 of FIG. 4) may load the second stage boot firmware (e.g., the fifth boot firmware 271 and 371 of FIGS. 2 and 3), at S1111. For example, the main chiplet 1110 may load the second stage boot firmware stored in the non-volatile memories (e.g., the fifth memories 270 and 370 of FIGS. 2 and 3) outside the chiplet system to the volatile memory inside the main chiplet 1110. In this case, a sub-chiplet 1120 (e.g., the second chiplets 120, 220, and 320, the third chiplets 130, 230, and 330, or the fourth chiplet 140, 240, and 340 of FIGS. 1 to 3 or the chiplet 400 of FIG. 4) may have been switched to the standby state. For example, at S1121, the sub-chiplet 1120 may be switched to the standby state for receiving a command of the main chiplet 1110. The operation at S1111 may correspond to the operation at S817 of FIG. 8, and the operation at S1121 may correspond to the operation at S826 of FIG. 8.

At S1112, the main chiplet 1110 may initialize a second interface (e.g., the second interface 161 of FIG. 1) for communication with an external device and may switch to a detection state. The second interface may refer to the host interface, and may include PCIe, etc., for example. For example, by initializing the PCIe interface, the main chiplet 1110 may support the host device outside the chiplet system (e.g., the host device 160 in FIG. 1) (or host system) to recognize the chiplet system, which is a PCIe device, within a predetermined time limit. In addition, after initializing the PCIe interface, the main chiplet 1110 may switch the LTSSM to the detection state to detect a link related to the connection of the device through the PCIe interface.

At S1113, the main chiplet 1110 may set the configuration for inter-chiplet connection. The configuration may include address information for data transmission and reception between chiplets. For example, the configuration may include a route table. That is, through the configuration for inter-chiplet connection, the main chiplet 1110 may set a connection method of the first interfaces (e.g., the first interfaces 151 to 154, 251 to 254, and 351 to 354 of FIGS. 1 to 3) for inter-chiplet connection.

After the configuration for inter-chiplet connection is set, the main chiplet 1110 may transmit at least a part of the second stage boot firmware to the sub-chiplet 1120, as illustrated in S1114. In this case, the sub-chiplet 1120 may perform the integrity check on at least a part of the second stage boot firmware, at S1122. For example, the sub-chiplet 1120 may perform the integrity check on at least a part of the second stage boot firmware using the immutable source (e.g., the second source 321*a*, the third source 331*a*, or the fourth source 341*a* of FIG. 3) through the security module (e.g., the second security module 321, the third security module 331, or the fourth security module 341 of FIG. 3). The integrity check process may be the same as or similar to that described above with reference to FIG. 5. As described above, by cross-checking the integrity of the second stage boot firmware, reliability and security of the secure booting of the chiplet system may be increased. At S1115 and S1123, the main chiplet 1110 and the sub-chiplet 1120 may perform initialization of the other components or functions in parallel. For example, the main chiplet 1110 and the sub-chiplet 1120 may perform the initialization operation required for driving the chiplet system, etc. in parallel. The initialization operation required for driving the chiplet system may include an operation of initializing a memory (e.g., DRAM) to load at least one of the application firmware or the operating system, for example.

At S1116, the main chiplet 1110 may load at least one of the application firmware or the operating system. For example, the main chiplet 1110 may load at least one of the application firmware or the operating system to the memory initialized at S1015.

At S1117, the main chiplet 1110 may execute at least one of the application firmware or the operating system. For example, the main chiplet 1110 may execute at least one of the application firmware or the operating system loaded to the memory. In addition, if necessary, while executing at least one of the application firmware or the operating system, the main chiplet 1110 may transmit a command to the sub-chiplet 1120, as illustrated in S1118. In this case, the sub-chiplet 1120 receiving the command may execute at least one of the application firmware or the operating system based on the received command, at S1124. For example, the sub-chiplet 1120 may execute at least one of the application firmware or the operating system in parallel or in association with the main chiplet 1110.

Figure 12:
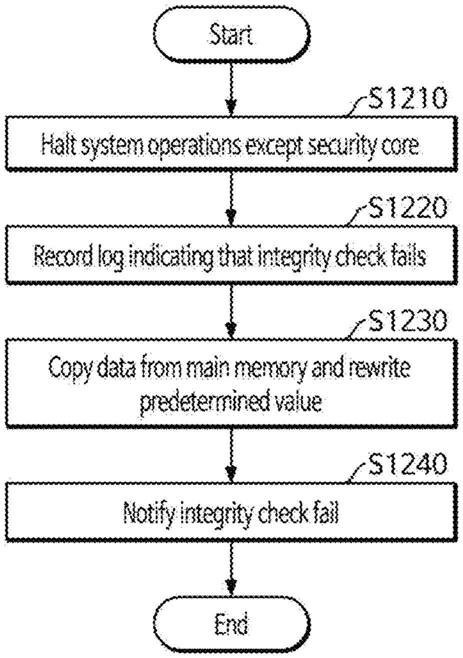
FIG. 12 is a diagram provided to explain a method for performing a system protection process.

FIG. 12 is a diagram provided to explain a method for performing a system protection process. Referring to FIG. 12, a security core (e.g., the security core 431 of FIG. 4) may halt system operations other than the security core, at S1210. If it is determined as a result of performing an (runtime) integrity check that data (e.g., the first data 510 in FIG. 5) stored in the main memory (e.g., the main memory 413 in FIGS. 4 and 5) has been modified, the security core may initiate a system protection process by immediately halting the operation of the entire system, including the main core (e.g., the main core 411 in FIG. 4). In this case, the main core may remain in the halted state until a command to resume operation is received from the security core. During this process, the operation of the security core may not be halted.

At S1220, the security core may record a log indicating that the integrity check fails. For example, the security core may store the log information necessary for analyzing a problem situation in a separate memory (a memory accessible only to the security core) in the security core domain (e.g., the security core domain 430 of FIGS. 4 and 5).

At S1230, the security core may copy data from the main memory and/or rewrite predetermined values in the main memory. For example, the security core may store a predetermined value (e.g., "0") for the entire area of the main memory or an area of the main memory associated with the data detected to have been modified. Before storing a predetermined value for the entire area of the main memory, the security core may copy the data of the area of the main memory, excluding the area associated with the data detected to have been modified, to a predetermined area of a separate memory accessible to the security core.

At S1240, the security core may notify the host of the integrity check fail using an interrupt and terminate the system protection process. The security core may proceed with the recovery process to restart the system.

Figure 13:
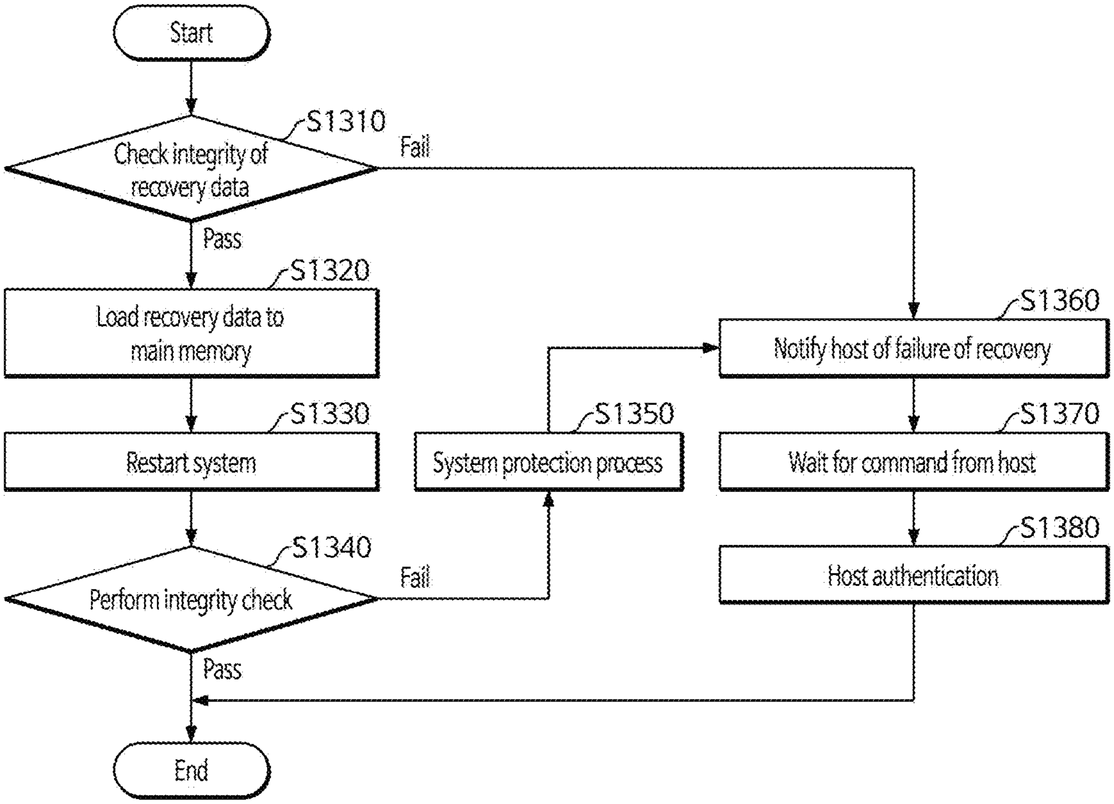
FIG. 13 is a diagram provided to explain a method for performing the recovery process.

FIG. 13 is a diagram provided to explain a method for performing the recovery process. Referring to FIG. 13, the security core (e.g., the security core 431 of FIG. 4) may check the integrity of recovery data, at S1310. For example, the security core may determine whether the recovery data has been modified or not, based on reliable recovery data (e.g., firmware, page table, etc.) stored separately in the non-volatile memory accessible to the security core and output values (e.g., hash values) stored in association with the recovery data. The operation of determining whether there has been modification or not may be performed in the same or similar manner as the integrity check process described above with reference to FIG. 5.

As a result of performing the operation at S1310, if it is determined that the recovery data is not modified, the security core may load the recovery data into the main memory (e.g., the main memory 413 of FIGS. 4 and 5), at S1320. For example, the security core may store the recovery data in an area of the main memory different from the area associated with the data detected to have been modified.

At S1330, the security core may restart the system. For example, the security core may restart the operation of the main core (e.g., the main core 411 of FIG. 4).

After the system is restarted, the security core may perform integrity check, at S1340. For example, the security core may perform the integrity check process described above with reference to FIG. 5 temporarily, periodically aperiodically, and/or for a predetermined period of time.

If the integrity check is successful (if the result of performing the integrity check indicates no abnormality), the recovery process may be terminated. Alternatively, if the integrity check fails, the security core may proceed with the system protection process, at S1350. For example, as a result of performing the integrity check, if it is determined that at least a part of the data stored in the main memory is modified, the security core may re-perform the system protection process described above with reference to FIG. 12.

If it is determined that the recovery data has been modified as a result of performing the operation at S1310, or if the re-execution of the system protection process at S1350 is completed, the security core may notify the host of the failure of the recovery, at S1360. For example, the security core may use an interrupt to notify the host of the failure of the recovery. The security core may wait for a command from the host, at S1370.

If the host's access to the system is detected while waiting for a command from the host, it may be assumed that the host was maliciously attacked, and thus the security core may perform authentication on the host's access to the system, at S1380. For example, the authentication process may be performed using an encryption key associated with the host managed by the encryption key manager (e.g., the encryption key manager 433 in FIGS. 4 and 5). In addition, for confidentiality, the authentication may be performed using a bi-directional encryption algorithm (e.g., symmetric key encryption algorithms such as AES and SEED or asymmetric key encryption algorithms such as RSA and DSA).

The security core may perform the system protection process described above with reference to FIG. 12 and then perform the recovery process for re-driving the system. Alternatively, at least a part of the system protection process and at least a part of the recovery process may be performed in parallel.

The flowchart and description above are merely examples and may be implemented differently in some examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The instructions may be executable by one or more processors, and may cause the processor(s) to perform certain aspects of the functions described in the present disclosure.

When implemented in software, the techniques may be stored on a computer-readable medium as one or more instructions or codes, or may be transmitted through a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of instructions or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. An electronic device comprising a plurality of chiplets, comprising:
- a main chiplet including a first memory in which first boot firmware is stored; and
- at least one sub-chiplet including a second memory in which second boot firmware is stored, wherein
- the main chiplet is configured to:
  - in response to receiving signal related to booting, initialize a first interface for inter-chiplet connection based on the first boot firmware;
  - acquire third boot firmware stored in an external memory;
  - initialize a second interface for communication between an external device and the main chiplet based on the third boot firmware;
  - set a configuration for interconnection between the main chiplet and the at least one sub-chiplet;
  - initialize a third memory included in the main chiplet; and
  - load at least one of an application firmware or an operating system to the third memory, and
- the at least one sub-chiplet is configured to,
  - in response to receiving the signal related to booting, initialize the first interface based on the second boot firmware.

2. The electronic device according to claim 1, wherein at least one of the main chiplet or the at least one sub-chiplet is configured to perform a phase-locked loop (PLL) control operation to adjust a clock frequency.

3. The electronic device according to claim 1, wherein the main chiplet is configured to:
- check a state of at least one of the main chiplet or the at least one sub-chiplet; and
- perform a recovery process, if abnormal state of the at least one of the main chiplet or the at least one sub-chiplet is identified based on the result of the check.

4. The electronic device according to claim 3, wherein the main chiplet is configured to:
- be connected to an external device for debugging; and
- check a state of at least one of the main chiplet or the at least one sub-chiplet using the external device.

5. The electronic device according to claim 3, wherein the main chiplet is configured to:
- if the abnormal state is identified as being due to the first interface, perform the recovery process through a third interface for connecting the main chiplet and the at least one sub-chiplet, wherein
- a speed of data transmission and reception provided by the third interface is set to be slower than a speed of data transmission and reception provided by the first interface.

6. The electronic device according to claim 1, wherein
- the second interface includes a peripheral component interconnect express (PCIe) interface, and
- the main chiplet is configured to:
  - after initializing the PCIe interface, switch a link training and status state machine (LTSSM) to a detection state to detect a link related to a connection of a device through the PCIe interface.

7. The electronic device according to claim 1, wherein the configuration includes address information for data transmission and reception between the main chiplet and the at least one sub-chiplet.

8. The electronic device according to claim 1, wherein the main chiplet is configured to:
- if the at least one sub-chiplet fails to initialize the first interface based on the second boot firmware, after acquiring the third boot firmware, initialize the first interface for connection with at least one first sub-chiplet, of the at least one sub-chiplet, adjacent to the main chiplet;
- set the configuration for interconnection between the main chiplet and the at least one first sub-chiplet; and
- initialize the first interface for connection with at least one second sub-chiplet, of the at least one sub-chiplet, adjacent to the at least one first sub-chiplet.

9. The electronic device according to claim 1, wherein the main chiplet further comprises a first security module in which an immutable first source is stored, the immutable first source including an encryption key or security data, and is configured to:
- check an integrity of the first boot firmware using the first source before initializing the first interface; and
- load the first boot firmware if the first boot firmware passes the integrity check.

10. The electronic device according to claim 9, wherein the main chiplet is configured to:
- before initializing the second interface, check an integrity of the third boot firmware using the first source; and
- load the third boot firmware if the third boot firmware passes the integrity check.

11. The electronic device according to claim 10, wherein the at least one sub-chiplet further comprises a second security module in which an immutable second source is stored, and are configured to:

check an integrity of the second boot firmware using the second source before initializing the first interface; and load the second boot firmware if the second boot firmware passes the integrity check.

12. The electronic device according to claim 11, wherein the main chiplet is configured to load at least a part of the third boot firmware to the at least one sub-chiplet if the third boot firmware passes the integrity check, and the at least one sub-chiplet is configured to:

check an integrity of the at least part of the third boot firmware using the second source; and perform at least a part a booting process based on the at least part of the third boot firmware, if the at least part of the third boot firmware passes the integrity check.

13. The electronic device according to claim 11, wherein the main chiplet is configured to proceed with a recovery process, if at least one of the first boot firmware, the second boot firmware, or the third boot firmware fails the integrity check.

14. The electronic device according to claim 1, wherein the main chiplet is configured such that, if the main chiplet and the at least one sub-chiplet are heterogeneous chiplets, different security levels of a booting process are set for the main chiplet and the at least one sub-chiplet.

15. The electronic device according to claim 1, wherein the main chiplet is configured to perform a runtime integrity check on the main chiplet and the at least one sub-chiplet after loading at least one of the application firmware or the operating system.

16. A method for booting an electronic device including a plurality of chiplets, comprising:

in response to receiving a signal related to booting, initializing a first interface for inter-chiplet connection based on first boot firmware stored in a first memory of a main chiplet and second boot firmware stored in a second memory of at least one sub-chiplet;

acquiring third boot firmware stored in an external memory;

initializing a second interface for communication between an external device and the main chiplet based on the third boot firmware;

setting configuration for interconnection between the main chiplet and the at least one sub-chiplet;

initializing a third memory included in the main chiplet; and loading at least one of an application firmware or an operating system to the third memory.

17. The method according to claim 16, further comprising:

before initializing the first interface, checking an integrity of the first boot firmware using a first immutable source stored in a first security module of the main chiplet, the first immutable source including an encryption key or security data; and loading the first boot firmware if the first boot firmware passes the integrity check.

18. The method according to claim 17, further comprising:

before initializing the second interface, checking an integrity of the third boot firmware using the first source; and loading the third boot firmware if the third boot firmware passes the integrity check.

19. The method according to claim 18, further comprising:

before initializing the first interface, checking an integrity of the second boot firmware using an immutable second source stored in a second security module of the at least one sub-chiplet; and loading the second boot firmware if the second boot firmware passes the integrity check.

20. The method according to claim 19, further comprising:

loading at least a part of the third boot firmware to the at least one sub-chiplet if the third boot firmware passes the integrity check, and checking an integrity of the at least part of the third boot firmware using the second source; and performing at least a part a booting process based on the at least part of the third boot firmware if the at least part of the third boot firmware passes the integrity check.

* * * * *